United States Patent
Kuroda et al.

(10) Patent No.: US 8,654,744 B2
(45) Date of Patent: Feb. 18, 2014

(54) RADIO COMMUNICATION SYSTEM, MOBILE STATION, BASE STATION, RADIO COMMUNICATION SYSTEM CONTROL METHOD USED FOR THE SAME, AND PROGRAM OF THE SAME

(75) Inventors: Nahoko Kuroda, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 1192 days.

(21) Appl. No.: 11/577,490

(22) PCT Filed: Oct. 19, 2005

(86) PCT No.: PCT/JP2005/019648
§ 371 (c)(1),
(2), (4) Date: Jun. 15, 2007

(87) PCT Pub. No.: WO2006/043712
PCT Pub. Date: Apr. 27, 2006

(65) Prior Publication Data
US 2009/0201885 A1    Aug. 13, 2009

(30) Foreign Application Priority Data
Oct. 20, 2004   (JP) .................................. 2004-305054

(51) Int. Cl.
*H04W 4/00*     (2009.01)
*H04B 7/216*    (2006.01)

(52) U.S. Cl.
USPC ........... 370/335; 370/328; 370/329; 370/338; 370/341

(58) Field of Classification Search
USPC ......... 370/235, 252–253, 311, 313, 328–330, 370/332–333, 335, 338, 341, 345–350, 370/912; 455/67.11, 450, 452.1–452.2, 455/507, 509, 513, 522, 550.1, 556.2, 561
See application file for complete search history.

(56) References Cited

U.S. PATENT DOCUMENTS 5,542,111 A  *  7/1996  Ivanov et al. ................. 455/522
7,020,112 B2    3/2006  Cleveland et al.
(Continued)

FOREIGN PATENT DOCUMENTS

EP        1653758 A1    5/2006
JP     2001-177470 A    6/2001
(Continued)

OTHER PUBLICATIONS

3GPP TS 25.214 V6.2.0 "Physical Layer Structure (FDD" (Jun. 2004)).

(Continued)

*Primary Examiner* — Meless Zewdu
(74) *Attorney, Agent, or Firm* — Sughrue Mion, PLLC

(57) ABSTRACT

The mobile station 2-1 determines whether a current maximum transmission rate is sufficient or not in a predetermined cycle by using a maximum transmission rate R indicated by a pointer, a volume Q of data accumulated in the buffer 22-1 and a requested delay T determined according to service of data. The mobile station 2-1 transmits a determination result as an RR signal in a predetermined control signal field within an uplink E-DPCH to the base station 1. The base station 1 receives an RR signal from the mobile station 2-1, determines an increment/decrement of the maximum transmission rate allowed for the mobile station 2-1 to use such that a noise rise fails to exceed a predetermined threshold value and notifies the mobile station 2-1 of the determination as an RG signal by a downlink E-DPCCH. The mobile station 2-1 ups or downs the position of the pointer according to the RG signal.

24 Claims, 12 Drawing Sheets

(56) References Cited

U.S. PATENT DOCUMENTS

| | | |
|---|---|---|
| 7,346,035 B2 * | 3/2008 | Lee et al. .................... 370/331 |
| 7,414,989 B2 * | 8/2008 | Kuchibhotla et al. ......... 370/329 |
| 7,949,924 B2 * | 5/2011 | Kim et al. .................... 714/751 |
| 2003/0073409 A1 * | 4/2003 | Nobukiyo et al. ........... 455/67.1 |
| 2003/0086375 A1 * | 5/2003 | Yano et al. ................... 370/235 |
| 2003/0109274 A1 * | 6/2003 | Budka et al. ................. 455/522 |
| 2005/0043051 A1 * | 2/2005 | Takano et al. ................ 455/522 |
| 2005/0105483 A1 * | 5/2005 | Uehara et al. ................ 370/315 |
| 2005/0201453 A1 * | 9/2005 | Gu ............................... 375/225 |
| 2006/0034226 A1 * | 2/2006 | Gu et al. ...................... 370/332 |
| 2006/0176866 A1 * | 8/2006 | Wakabayashi ............... 370/342 |

FOREIGN PATENT DOCUMENTS

| | | |
|---|---|---|
| JP | 2003-199173 A | 7/2003 |
| JP | 2004-215276 A | 7/2004 |
| KR | 2002-0055355 A | 7/2002 |
| KR | 2004-39760 A | 5/2004 |
| WO | 2004/062205 A1 | 7/2004 |
| WO | 2005/015768 A1 | 2/2005 |

OTHER PUBLICATIONS

3GGP ($3^{rd}$ Generation Partnership Projects), Enhanced Uplink Dedicated Channel: Uplink High-Speed Packet Transmission System; "Feasibility Study for Enhanced Uplink for UTRA FDD", 3GPP TR 25.896 V6.0.0, Mar. 2004.

3GPP TS25.211 V6.1.0 "Physical Channels and Mapping of Transport Channels onto Physical Channels (FDD)", Jun. 2004.

Search Report issued May 3, 2012 by the European Patent Office in counterpart European Application No. 05799399.0.

"Universal Mobile Telecommunications System (UMTS); Physical Layer Procedures (FDD) (3GPP TS 25.214 version 6.2.0 Release 6); ETSI TS 125 214", IEEE, LIS, Sophia Antipolis Cedex, France, vol. 3-R1, No. V6.2.0, Jun. 1, 2004, XP0414016704.

* cited by examiner

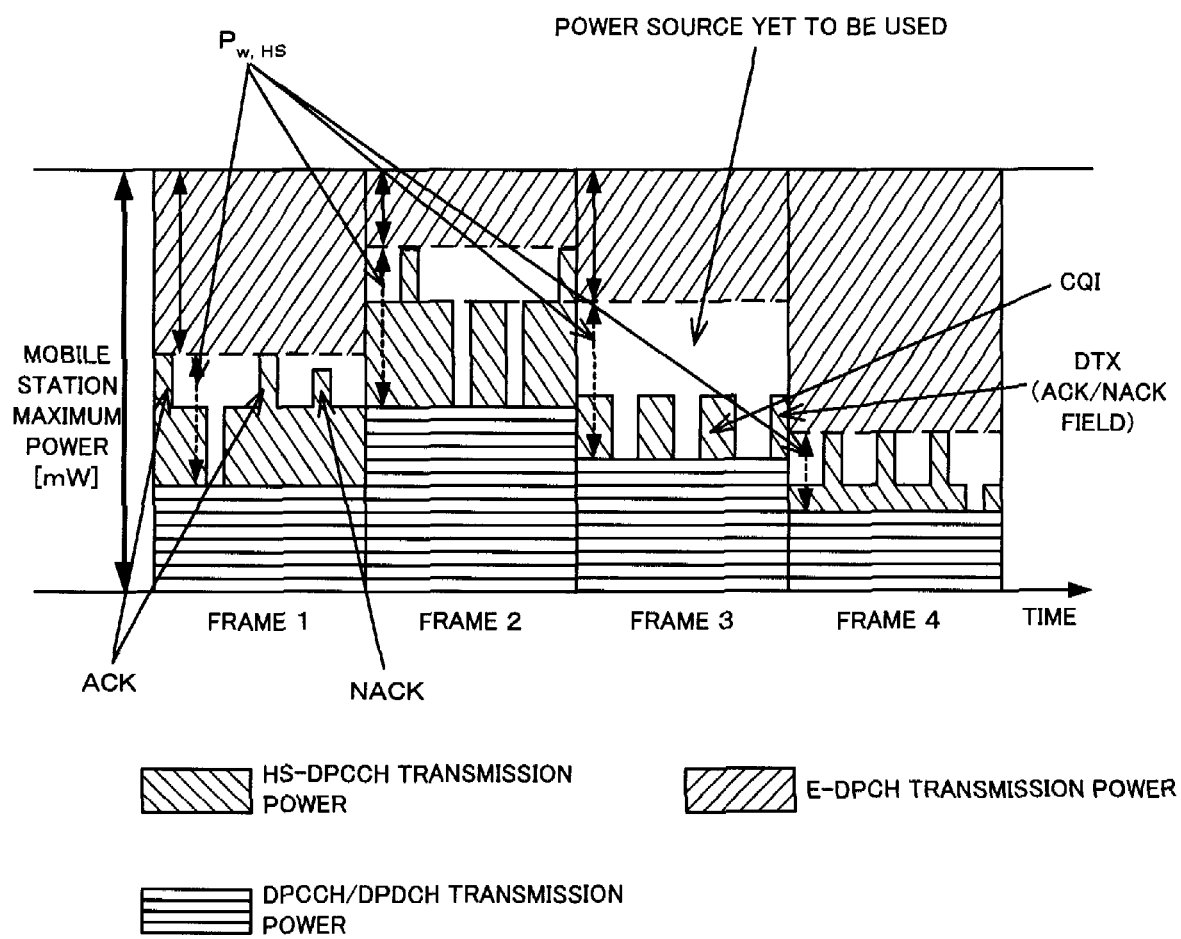

RADIO COMMUNICATION SYSTEM, MOBILE STATION, BASE STATION, RADIO COMMUNICATION SYSTEM CONTROL METHOD USED FOR THE SAME, AND PROGRAM OF THE SAME

This application claims priority from PCT Application No. PCT/JP2005/019648 filed Oct. 19, 2005, and from Japanese Patent Application No. 2004-305054 filed Oct. 20, 2004, which applications are incorporated herein by reference.

FIELD OF THE INVENTION

The present invention relates to a radio communication system, a mobile station and a base station, and a radio communication system controlling method used therefor and a program thereof and, more particularly, to a radio communication system controlling method in a case where high-speed packet transmission between an uplink and a downlink is executed.

DESCRIPTION OF THE RELATED ART

In a direct code spread multiple system used in WCDMA (Wideband Code Division Multiple Access), an information signal is spread by using a spread code on a transmission side and the signal is inversely spread by using the same code on a reception side, thereby increasing a ratio of desired wave power to interference or noise power (hereinafter referred to as SNIR (Signal to Noise Interference Ratio)).

Since with the SNIR being above predetermined quality, the reception side is allowed to receive a desired signal accurately, even when signals of a plurality of lines are transmitted in the same frequency band by using spreading, decoding of a signal on each line is enabled. Although in general, the lower the spread factor becomes, the larger the number of information bits which can be transmitted within a unit time becomes, resulting in increasing an information transmission rate, because an SNIR gain by inverse spreading is decreased to increase required power necessary for meeting predetermined quality. A desired wave of a certain mobile station, however, interferes a signal of other mobile station.

Accordingly, in WCDMA, transmission power of a mobile station and a base station is controlled by closed-loop type transmission power control such that SNIR will have the minimum power meeting desired quality (see e.g. 3GPP TS25.214 v6.2.0 "Physical Layer Structure (FDD" (2004-06)). When the number of connected mobile stations is excessively large or when a set maximum transmission rate is high, an interference component is increased, so that normal decoding might be impossible even by inverse spreading.

As to an uplink, it is accordingly necessary for a base station to measure a noise rise (reception power to noise power) and set the number of connected mobile stations and a maximum transmission rate such that the noise rise fails to exceed a predetermined threshold value. In a conventional WCDMA system, a base station control device is notified of a noise rise measurement value by a base station to control mobile station connection or reset a maximum transmission rate, thereby controlling the noise rise to be not more than a threshold value. This is relatively slow control because it is executed through the base station control device and it is necessary to set a mean value of a noise rise at the base station to be sufficiently smaller than a predetermined threshold value and take a good margin in preparation for a rapid noise rise increase.

In 3GPP (3rd Generation Partnership Projects), currently studied is EUDCH [Enhanced Uplink DCH (Dedicated Channel): uplink high-speed packet transmission system] (see e.g. 3GPP TR25.896 v6.0.0 "Feasibility Study for Enhanced Uplink for UTRA FDD" (2004-03)).

Studied in EUDCH is enabling a base station to control a maximum transmission rate of a mobile station such that a noise rise fails to exceed a predetermined threshold value. This enables higher-speed control than noise rise control by a base station control device and a noise rise variation to be reduced, thereby allowing a means value of a noise rise to be set to be higher accordingly. As a result, the number of connected mobile stations and a maximum transmission rate of a mobile station can be set higher than those by conventional art to improve uplink coverage and capacity.

Other than those described above, also studied in EUDCH is introducing HARQ (Hybrid Automatic Repeat Request) between a base station and a mobile station to enable the base station to make a retransmission request immediately upon detection of a block error. HARQ enables a retransmission request delay to be reduced, as well as increasing a probability of proper decoding of a re-transmitted packet by soft-composing the same with a preceding packet. It is therefore possible to reduce a delay caused by retransmission to improve a throughput more than that by a current WCDMA system in which a base station control device makes a retransmission request.

On the other hand, in EUDCH, it is highly probable that larger transmission power is required in order to support high-speed transmission. On an uplink, however, there occurs a case where transmitted other than an EUDCH channel [E-DPCH: Enhanced DPCH (Dedicated Physical Channel)] are individual channels [DPCCH (Dedicated Physical Control Channel), DPDCH (Dedicated Physical Data Channel)] and a control channel of HSDPA (High Speed Data Packet Access) [HS-DPCCH: Dedicated Physical Control Channel (uplink) for HS-DSCH (High Speed Downlink Shared Channel)] as a downlink high-speed packet transmission (see e.g. 3GPP TS25.211 v6.1.0 "Physical Channels and Mapping of Transport Channels onto Physical Channels (FDD)" (2004-06)).

In general, a control signal of a higher layer whose requested delay is severe and the like are transmitted by DPDCH as a circuit switch. In HS-DPCCH, a control signal for HSDPA is transmitted. In general, a failure of transmission of a control signal of a higher layer at desired timing might cause line cut-off or the like and a failure of proper reception of a control signal of HSDPA prevents proper notification of packet reception completion/non-completion, resulting in requesting useless retransmission or requiring retransmission at the base station control device, thereby increasing a delay. For giving preference to control signal transmission over data transmission, therefore, first ensure required power of DPDCH, DPCCH and HS-DPCCH, and then make remaining power obtained by subtracting power of these channels from maximum power of the mobile station be power usable for E-DPCH.

FIG. 10 shows a schematic diagram of power variation when DPCCH, DPDCH and E-DPCH are transmitted. Here, a transmission time unit of DPDCH and E-DPCH is set to be one frame (=15 slots) and a transmission rate can not be changed within each transmission time unit. The mobile station first decides on a transmission rate of DPDCH in a subsequent frame immediately before start of each frame, and calculates desired power $P_{w,DPDCH}$ [mW] of the decided transmission rate.

Thereafter, set power obtained by subtracting required power $P_{w,DPDCH}$ [mW] and $P_{w,DPCCH}$ [mW] of DPDCH and DPCCH from the maximum power $P_{w,max}$ [mW] of the mobile station to be power $P_{w,EDPCH}$ [mW] which can be used by E-DPCH to decide on a transmission rate whose power is not more than usable power and which satisfies a required transmission rate of E-DPCH. In the subsequent frame, transmit DPCCH, DPDCH and E-DPCH with required power of the determined transmission rate.

Assume here as a power value expression that in a case where with a first subscript as "w", that is, $P_{w,name}$, represents a true value ([mW]) and with the first subscript as "d", that is, $P_{d,name}$ represents a decibel value ([dBm]). Such conversion expression as follows is applied between them:

$$P_{d,name}[dBm]=10\ log(P_{w,name}[mW])$$

With the above-described direct code spread multiple system, however, there is a case where HS-DPCCH is transmitted on an uplink. On HS-DPCCH, an ACK (Acknowledgement)/NACK (Negative Acknowledgement) signal which notifies a reception result of a packet received on a downlink and a CQI (Channel Quality Indicator) signal which notifies reception quality of a downlink are transmitted.

These signals are transmitted by power obtained by adding power offsets $\Delta_{CQI}$, $\Delta_{ACK}$ and $\Delta_{NACK}$[dB] notified by the network in advance to power $P_{d,DPCCH}$[dBm] of DPCCH, to which $\Delta_{CQI}$, $\Delta_{ACK}$ and $\Delta_{NACK}$, difference values can be set. Although since the ACK/NACK signal is in particular required to have a low error rate, $\Delta_{ACK}$ and $\Delta_{NACK}$ are in many cases set to be higher than $\Delta_{CQI}$, its transmission will be irregular because the ACK/NACK signal is generated in response to downlink packet reception. As shown in FIG. 11, therefore, required power $P_{w,HS}$[mW] of HS-DPCCH is irregularly increased or decreased within a frame by the ACK/NACK signal to make determination of power which can be used for E-DPCH before starting the frame difficult.

Assume in FIG. 11, for example, that power obtained by subtracting the required power $P_{w,HS}$, $P_{w,DPDCH}$ and $P_{w,DPCCH}$[mW] of HS-DPCCH, DPDCH and DPCCH at the start of each frame from the maximum power $P_{w,MAX}$[mW] of the mobile station is power which can be used for E-DPCH. Although in such a case where no transmission of the ACK/NACK signal exists at the start of a frame as a frame 2 in the figure, the power which can be used for E-DPCH will be $P_1$[mW], when transmission of E-DPCH is started at a transmission rate whose required power is $P_1$, a total of required power will exceed maximum power of the mobile station at the occurrence of transmission of the ACK/NACK signal in the frame.

With conventional WCDMA, when required power exceeds maximum power, power of each channel is evenly reduced to make the required power be the maximum power while maintaining a power ratio of all the channels to be constant (all channel even reduction). Executing all channel even reduction leads to deterioration of reception quality not only of E-DPCH but also of DPDCH or HS-DPCCH.

As described in the conventional art, a control signal of a higher layer or HSDPA is transmitted on DPDCH and HS-DPCCH and when these develop an error, such a problem occurs as line cut-off or an increase in an HSDPA transmission delay. On the other hand, in a case not of all channel even reduction but of preferential reduction of E-DPCH, when transmission of the ACK/NACK signal occurs frequently within a frame, for example, when a downlink packet is successively transmitted, five slots in one frame (15 slots), that is, one-third of the frame will have reduced power to have a possibility that E-DPCH quality will considerably deteriorate. As a result, no E-DPCH will be properly received to increase retransmission, thereby increasing a transmission delay.

Furthermore, as another simple expansion, also possible is ensuring power of the ACK/NACK signal all the time. More specifically, it is a method in which power $P_{d,MAX-HS}$ [dBm] obtained by adding a maximum power offset of HS-DPCCH:

$$\Delta_{max}[dB]=max(\Delta_{CQI},\Delta_{ACK},\Delta_{NACK})[dB]$$

to the DPCCH power is used as required power $P_{d,HS}$ [dBm] of HS-DPCCH and the remaining power obtained by subtracting the power $P_{w,DPDCH}$, $P_{w,DPCCH}$ and $P_{w,HS}$ [mW] of DPDCH, DPCCH and HS-DPCCH from the maximum power $P_{w,MAX}$ [mW] is used as power which can be used for E-DPCH (see FIG. 12).

In this case, while such a problem of excess over maximum power as described above is resolved, because power is ensured for the ACK/NACK signal even when no AKC/NACK signal is transmitted at all as in a frame 3, power which can be used for E-DPCH is reduced to degrade a throughput of E-DPCH.

Thus, an object of the present invention is to provide a radio communication system, a mobile station and a base station, and a radio communication system controlling method used therefor and a program thereof which solve the above-described problems and enable reception quality of DPDCH and HS-DPCCH to be improved, as well as enabling a throughput of E-DPCH to be increased.

SUMMARY OF THE INVENTION

A radio communication system according to the present invention is a radio communication system enabling execution of high-speed packet transmission on an uplink and a downlink between a base station and a mobile station, in which the base station includes a first transmission means for transmitting a downlink packet transmission notification signal to the mobile station and a second transmission means for transmitting a downlink packet to the mobile station after a predetermined time after the transmission of the downlink packet transmission notification signal, and the mobile station includes a reception means for, upon receiving a downlink packet transmission notification signal directed to its own station, receiving a corresponding downlink packet, a first determination means for determining power usable in each transmission time unit of a first channel of the uplink according to the number of downlink packet transmission notification signals directed to its own station which have been received in a first predetermined time interval prior to the relevant transmission time unit, a second determination means for determining a transmission rate of the first channel based on the usable power, and a transmission means for transmitting an uplink packet by the first channel by using a determined transmission rate and transmitting a reception result notification signal of a downlink packet by a second channel of the uplink.

The mobile station according to the present invention is a mobile station which enables execution of high-speed packet transmission on an uplink and a downlink provided between the station and the base station and includes a reception means for, upon receiving a downlink packet transmission notification signal directed to its own station, receiving a corresponding downlink packet, a first determination means for determining power usable in each transmission time unit of a first channel of the uplink according to the number of downlink packet transmission notification signals directed to its own station which have been received in a first predetermined time interval prior to the relevant transmission time unit, a second determination means for determining a transmission rate of the first channel based on the usable power, and a transmission means for transmitting an uplink packet by the first channel by using a determined transmission rate and transmitting a reception result notification signal of a downlink packet by a second channel of the uplink.

The base station according to the present invention is a base station which enables execution of high-speed packet transmission on an uplink and a downlink provided between the station and the mobile station and includes a first transmission means for transmitting a downlink packet transmission notification signal to the mobile station, a second transmission means for transmitting a downlink packet to the mobile station after a predetermined time after the transmission of the downlink packet transmission notification signal, and a determination means for determining whether transmission of a downlink packet to the mobile station in each transmission time unit of a first channel of the uplink is allowed or not according to the number of the downlink packet transmission notification signals transmitted to the mobile station in a first predetermined time interval prior to the relevant transmission time unit.

A radio communication system controlling method according to the present invention is a radio communication system controlling method of controlling a radio communication system enabling execution of high-speed packet transmission on an uplink and a downlink between a base station and a mobile station, in which the base station transmits a downlink packet transmission notification signal to transmit a downlink packet after a predetermined time after the transmission of the downlink packet transmission notification signal, and the mobile station, upon receiving a downlink packet transmission notification signal directed to its own station, receives a corresponding downlink packet, determines power usable in each transmission time unit of a first channel of the uplink according to the number of downlink packet transmission notification signals directed to its own station which have been received in a first predetermined time interval prior to the relevant transmission time unit, determines a transmission rate of the first channel based on the usable power, transmits an uplink packet by the first channel by using a determined transmission rate and transmits a reception result notification signal of a downlink packet by a second channel of the uplink.

A program of a radio communication system controlling method according to the present invention is a program of a radio communication system controlling method of controlling a radio communication system that enables execution of high-speed packet transmission on an uplink and a downlink between a base station and a mobile station, which causes a computer of the mobile station to execute processing of, upon receiving a downlink packet transmission notification signal directed to its own station, receiving a corresponding downlink packet, processing of determining power usable in each transmission time unit of a first channel of the uplink according to the number of downlink packet transmission notification signals directed to its own station which have been received in a first predetermined time interval prior to the relevant transmission time unit, processing of determining a transmission rate of the first channel based on the usable power, and processing of transmitting an uplink packet by the first channel by using a determined transmission rate and transmitting a reception result notification signal of a downlink packet by a second channel of the uplink.

Another program of a radio communication system controlling method according to the present invention is a program of a radio communication system controlling method of controlling a radio communication system which enables execution of high-speed packet transmission on an uplink and a downlink between a base station and a mobile station, which causes a computer of the base station to execute processing of transmitting a downlink packet transmission notification signal to the mobile station, processing of transmitting a downlink packet to the mobile station after a predetermined time after the transmission of the downlink packet transmission notification signal, and processing of determining whether transmission of a downlink packet to the mobile station in each transmission time unit of a first channel of the uplink is allowed or not according to the number of the downlink packet transmission notification signals transmitted to the mobile station in a first predetermined time interval prior to the relevant transmission time unit.

More specifically, in the radio communication system of the present invention, the base station includes a means for transmitting a downlink packet transmission notification signal and a means for transmitting a downlink packet after a predetermined time after the transmission of the downlink packet transmission notification signal, and the mobile station includes a means for, upon receiving a downlink packet transmission notification signal directed to its own station, receiving a corresponding downlink packet, a means for determining power usable in each transmission time unit of the first channel of the uplink according to the number of downlink packet transmission notification signals directed to its own station which have been received in a first predetermined time interval prior to the relevant transmission time unit, a means for determining a transmission rate of the first channel based on the usable power, and a means for transmitting an uplink packet by the first channel by using a determined transmission rate and transmitting a reception result notification signal of a downlink packet by a second channel of the uplink.

The mobile station, when receiving the downlink packet transmission notification signal directed to its own station, receives a corresponding downlink packet, determines power usable in each transmission time unit of the first channel of the uplink according to the number of downlink packet transmission notification signals directed to its own station which have been received in the first predetermined time interval prior to the relevant transmission time unit, and determines a transmission rate of the first channel based on the determined usable power, as well as transmitting an uplink packet by the first channel by using the determined transmission rate and transmitting a reception result notification signal of a downlink packet by the second channel of the uplink.

In addition, the base station transmits a downlink packet transmission notification signal, transmits a downlink packet after a predetermined time after the transmission of the downlink packet transmission notification signal, and determines whether transmission of a downlink packet to the mobile station in each transmission time unit of the first channel of the uplink is allowed or not according to the number of the downlink packet transmission notification signals transmitted to the mobile station in the first predetermined time interval prior to the relevant transmission time unit.

In a first radio communication system controlling method of the present invention, a base station transmits a downlink packet transmission notification signal and transmits a downlink packet after a predetermined time after the transmission of the downlink packet transmission notification signal, and a mobile station, upon receiving a downlink packet transmission notification signal directed to its own station, receives a corresponding downlink packet, determines power usable in each transmission time unit of a first channel of an uplink according to the number of downlink packet transmission notification signals directed to its own station which have been received in a first predetermined time interval prior to the relevant transmission time unit, determines a transmission rate of the first channel based on the usable power, transmits an uplink packet by the first channel by using a determined transmission rate and transmits a reception result notification signal of a downlink packet by a second channel of the uplink.

In a second radio communication system controlling method of the present invention, when in the first predetermined time interval, the number of received downlink packet transmission notification signals directed to its own station is larger than the first predetermined threshold value, remaining power obtained by subtracting required transmission power of a reception result notification signal from maximum power of the mobile station is assumed to be power usable for the first channel.

In a third radio communication system controlling method of the present invention, when required transmission power of the uplink exceeds maximum power of the mobile station, power of the first channel is preferentially reduced.

In a fourth radio communication system controlling method of the present invention, according to the number of downlink packet transmission notification signals transmitted to the mobile station in the first predetermined time interval, the base station determines whether transmission of a downlink packet to the mobile station is allowed or not.

In a fifth radio communication system controlling method of the present invention, when in the first predetermined time interval, the number of downlink packet transmission notification signals transmitted to the mobile station is larger than a second predetermined threshold value, the base station refrains from transmitting the packet transmission notification signal to the mobile station in a second predetermined time interval after the first predetermined time interval.

In a sixth radio communication system controlling method of the present invention, the mobile station transmits a third channel of the uplink, controls transmission power of the third channel to satisfy required quality by closed loop type transmission power control and assumes power obtained by adding a predetermined power offset to power of the third channel as required transmission power of the reception result notification signal.

In a seventh radio communication system controlling method of the present invention, when in the first predetermined time interval, the number of received downlink packet transmission notification signals directed to its own station is not less than one, remaining power obtained by subtracting required transmission power of the reception result notification signal from the maximum power of the mobile station is assumed to be power usable for the first channel.

In an eighth radio communication system controlling method of the present invention, when in the first predetermined time interval, the number of downlink packet transmission notification signals transmitted to the mobile station is not less than one, the base station refrains from transmitting the packet transmission notification signal to the mobile station in the second predetermined time interval after the first predetermined time interval.

Thus, the radio communication system controlling method of the present invention increases power usable for E-DPCH [Enhanced DPCH (Dedicated Physical Channel)] while reducing a probability that a total of required power will exceed maximum power of the mobile station due to transmission of an ACK (Acknowledgement)/NACK (Negative Acknowledgement) signal, thereby improving reception quality of DPDCH (Dedicated Physical Data Channel) and HS-DPCCH [Dedicated Physical Control Channel (uplink) for HS-DSCH (High Speed Downlink Shared Channel)] and increasing a throughput of E-DPCH.

BRIEF DESCRIPTION OF THE DRAWINGS

FIG. 12 is a diagram for use in explaining a problem in conventional art.

DESCRIPTION OF THE PREFERRED EMBODIMENT

Figure 1:
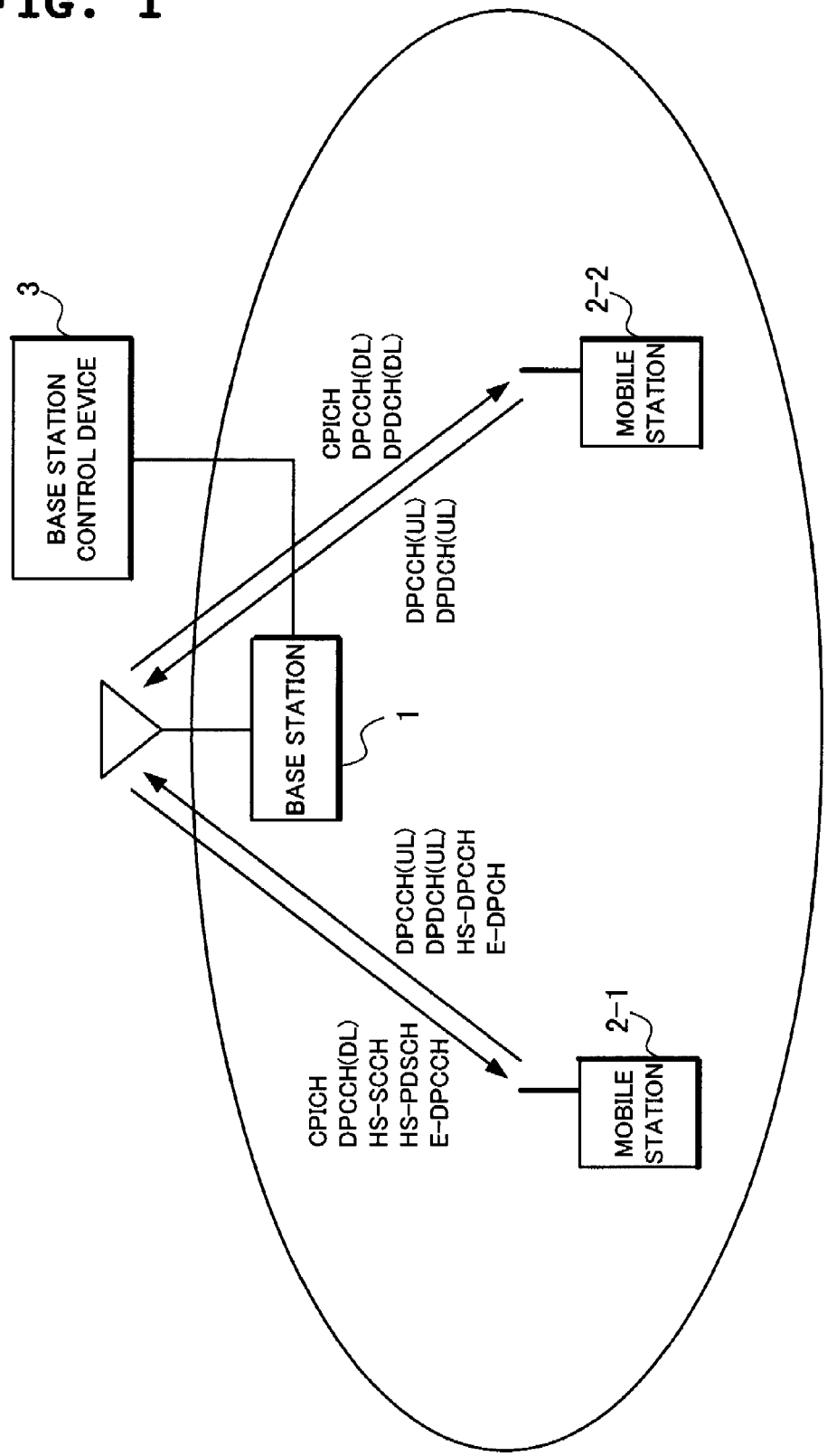
FIG. 1 is a block diagram showing a structure of a radio communication system according to a mode of implementation of the present invention.

Next, a mode of implementation of the present invention will be described with reference to the drawings. FIG. 1 is a block diagram showing a structure of a radio communication system according to a mode of implementation of the present invention. Shown in FIG. 1 is such a radio communication system as simultaneously provides services of HSDPA (High Speed Data Packet Access) and EUDCH [Enhanced Uplink DCH (Dedicated Channel): uplink high-speed packet transmission system] by using a WCDMA (Wideband Code Division Multiple Access) system.

The radio communication system according to the mode of implementation of the present invention includes a base station 1, a plurality of mobile stations 2-1 and 2-2, and a base station control device 3 to which the base station 1 is connected.

The base station 1 and the mobile station 2-1 execute transmission and reception with an individual control channel (DPCCH: Dedicated Physical Control Channel) and an individual data channel (DPDCH: Dedicated Physical Data Channel) set. With both uplink/downlink DPCCH including a pilot signal and a TPC (Transmission Power Control) signal, the mobile station 2-1 and the base station 1 each measure reception quality of the pilot signal and transmit the TPC signal which instructs on increment/decrement of power so as to close to a predetermined target SIR (Signal to Interference Ratio) to execute high-speed closed-loop type transmission power control.

In addition, DPCCH also includes a transmission rate information signal (TFCI: Transport Format Combination Indicator) of DPDCH.

On the other hand, with HS-SCCH (High Speed-Shared Control Channel), HS-PDSCH (High Speed-Physical Data Shared Channel), HS-DPCCH (High Speed-Dedicated Physical Control Channel), E-DPCH (Enhanced-Dedicated Physical Channel) and E-DPCCH (Enhanced-Dedicated Physical Control Channel) set together with the individual channels, the base station 1 and the mobile station 2-2 execute high-speed packet transmission on downlink/uplink.

Assume here that between the base station 1 and the mobile station 2-2, downlink high-speed packet transmission is executed by HSDPA and uplink high-speed packet transmission is executed by EUDCH. In addition, HS-SCCH is a downlink control channel of HSDPA, HS-PDSCH is a data channel of HSDPA, HS-DPCCH is an uplink control channel of HSPDA, E-DPCH is an uplink channel which transmits data and a control signal of EUDCH, and E-DPCCH is a downlink channel which transmits a control signal of EUDCH.

Furthermore, the base station 1 transmits a common pilot channel (CPICH) to all the mobile stations 2-1 and 2-2 in the cell. The mobile stations 2-1 and 2-2 in the cell establish and ensure synchronization by using CPICH and measure reception quality of a propagation path.

In the mode of implementation of the present invention, used as a time unit related to transmission processing are a frame and a sub-frame. In the mode of implementation of the present invention, a frame length is assumed to be 10 ms (=15 slots) and a sub-frame length is assumed to be 2 ms (=3 slots). In addition, a data transmission rate can be determined for each transmission time unit and it can not be changed within the transmission time unit. A transmission time interval (TTI) of the transmission time unit can be set to have a different value for each channel and in the mode of implementation of the present invention, TTI of channels (HS-SCCH, HS-PDSCH, HS-DPCCH) related to HSDPA is assumed to be one sub-frame and TTI of channels (E-DPCCH, E-DPCH) related to EUDCH, and DPDCH and DPCCH is assumed to be one frame.

Figure 2:
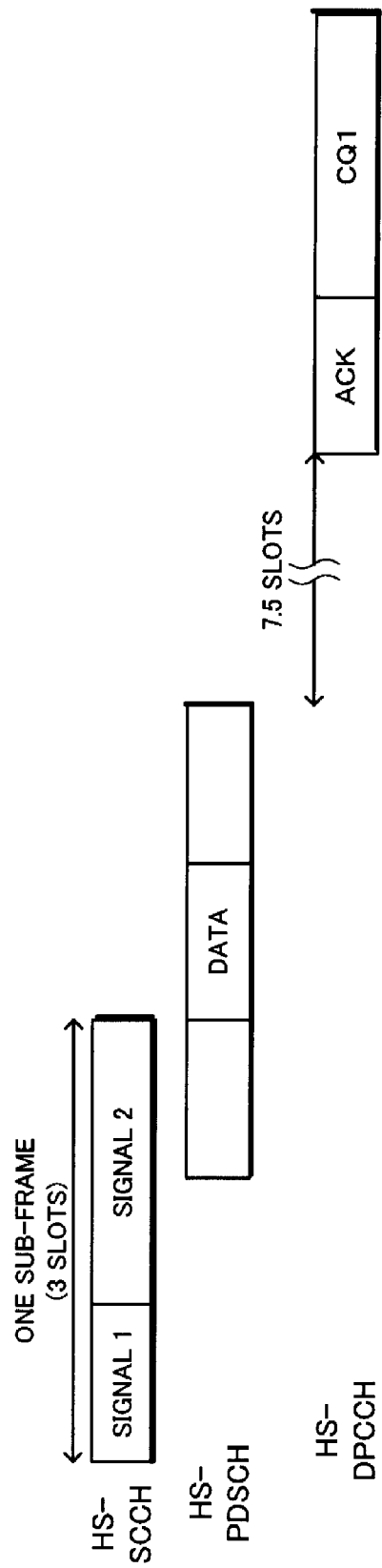
FIG. 2 is a diagram for use in explaining a structure of an HSDPA channel and a relationship of transmission timing.

FIG. 2 is a diagram for use in explaining structures of HSDPA channels and a relationship of transmission timing. Shown in FIG. 2 are frame structures and transmission timing of channels (HS-SCCH, HS-PDSCH, HS-DPCCH) related to HSDPA.

HS-SCCH is a shared channel for transmitting a downlink packet transmission notification signal which notifies transmission of HS-PDSCH, on which signals to a plurality of mobile stations are time-multiplexed on a sub-frame basis for transmission. In addition, the downlink packet transmission notification signal includes control signals (transport block size, modulation, coding rate, the number of codes, etc) necessary for receiving HS-PDSCH data, which are classified into two control signal sets ([control signal set 1] and [control signal set 2]).

The [control signal set 1] includes information (modulation, the number of codes) necessary for the mobile stations 2-1 and 2-2 to execute inverse spreading and is transmitted in the first slot of each HS-SCCH sub-frame. The [control signal set 2] includes a control signal related to HARQ which is necessary for decoding processing and is transmitted in second and third slots of each HS-SCCH sub-frame. Thus, the reason why the signals are divided into two control signals sets is to enable inverse spread of HS-PDSCH to be started at a stage of receiving the first slot of HS-SCCH to reduce a reception delay of HS-PDSCH.

In addition, since HS-SCCH transmits signals of the plurality of mobile stations 2-1 and 2-2 in time-multiplexing manner, each of the mobile stations 2-1 and 2-2 needs to determine whether it is a downlink packet transmission notification signal directed to its own station or not. Therefore, the base station 1 transmits a data block of the [control signal set 1] as being masked with mobile station ID (identification information) of the mobile stations 2-1 and 2-2 to which transmission is made. The mobile station ID is notified to the base station 1 and each of the mobile stations 2-1 and 2-2 by the base station control device 3 in advance, and upon receiving a first slot of the HS-SCCH sub-frame, the mobile station 2-1, 2-2 removes masking by its own station ID and when obtaining the [control signal set 1], determines that it is a control signal directed to its own station to start reception of the corresponding HS-PDSCH.

HS-PDSCH is a shared channel for executing high-speed data transmission, on which transmission is made with a delay of two slots from HS-SCCH. HS-DPCCH is a control channel of an uplink, which transmits a CQI (Channel Quality Indicator) signal for notifying a downlink reception quality measurement result and an ACK (Acknowledgement)/NACK (Negative Acknowledgement) signal for notifying a packet reception result. The ACK/NACK signal is transmitted in the first slot of the HS-DPCCH sub-frame after about 7.5 slots after the reception of the packet by HS-PDSCH, and the CQI signal is transmitted in the second and third slots of the HS-DPCCH sub-frame in a cycle instructed in advance by the network. Transmission power of HS-DPCCH is determined based on offset power $\Delta_{CQI}$, $\Delta_{ACK}$ and $\Delta_{NACK}$ which are notified in advance by the network similarly to the above-described conventional art.

Figure 3:
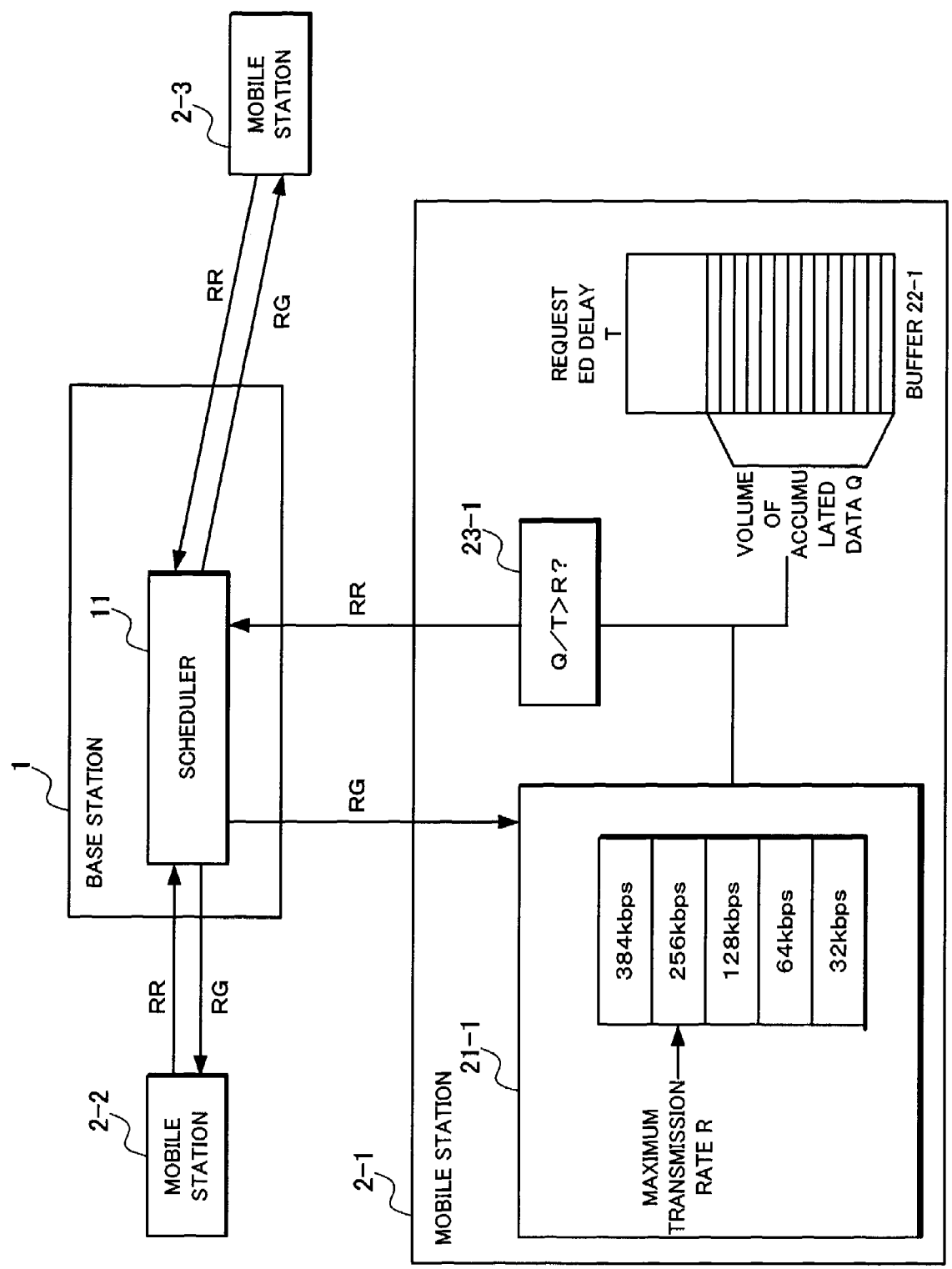
FIG. 3 is a diagram for use in explaining one example of a scheduling method used in EUDCH.

FIG. 3 is a diagram for use in explaining one example of a scheduling method used in EUDCH. Description made in FIG. 3 is one example of a method of controlling a maximum transmission rate of EUDCH. Shown in FIG. 3 is a control method at the mobile station 2-1, with the other mobile stations 2-2 and 2-3 adopting the same control method as that of the mobile station 2-1, and the control executed at the mobile station 2-1 will be described in the following.

Similarly to the above-described conventional art, the maximum transmission rate of EUDCH is controlled by the base station 1. The base station control device 2 notifies the mobile station 2-1 and the base station 1 of a set of transmission rates (32 kbps, 64 kbps, 128 kbps, 256 kbps, 384 kbps) in advance and the mobile station 2-1 holds a pointer indicative of a maximum transmission rate currently allowed to use in the transmission rate set (See 21-1 in FIG. 3).

The mobile station 2-1 determines whether a current maximum transmission rate is sufficient or not in a predetermined cycle according to the following conditions by using a maximum transmission rate R indicated by the pointer, a volume of data Q accumulated in a buffer 22-1 and a requested delay T determined according to service of data (see 23-1 in FIG. 3):

Q/T≥R: maximum transmission rate increase request (Up)
Q/T<R: maximum transmission rate decrease request (Down)

The mobile station 2-1 transmits a determination result as an RR (Rate Request) signal in a predetermined control signal field in the uplink E-DPCH to the base station 1. The base station 1 receives the RR signal from the mobile station 2-1, determines an increment or a decrement of the maximum transmission rate allowed for the mobile station 2-1 to use such that a noise rise fails to exceed a predetermined value and notifies the mobile station 2-1 of the determination as an RG (Rate Grant) signal by the downlink E-DPCCH. The mobile station 2-1 ups or downs a position of the pointer according to the RG signal.

The mobile stations 2-1 to 2-3 and the base station 1 in the mode of implementation of the present invention are characterized in that i) the mobile stations 2-1 to 2-3 determine, according to a reception result of the first slot of HS-SCCH, power which can be used for E-DPCH in a subsequent frame, ii) an HSDPA scheduler of the base station schedules downlink packet transmission taking power which can be used for E-DPCH into consideration, and iii) when the total required power of the uplink exceeds maximum power of the mobile stations 2-1 to 2-3, the mobile stations 2-1 to 2-3 preferentially reduce power of E-DPCH.

Figure 4:
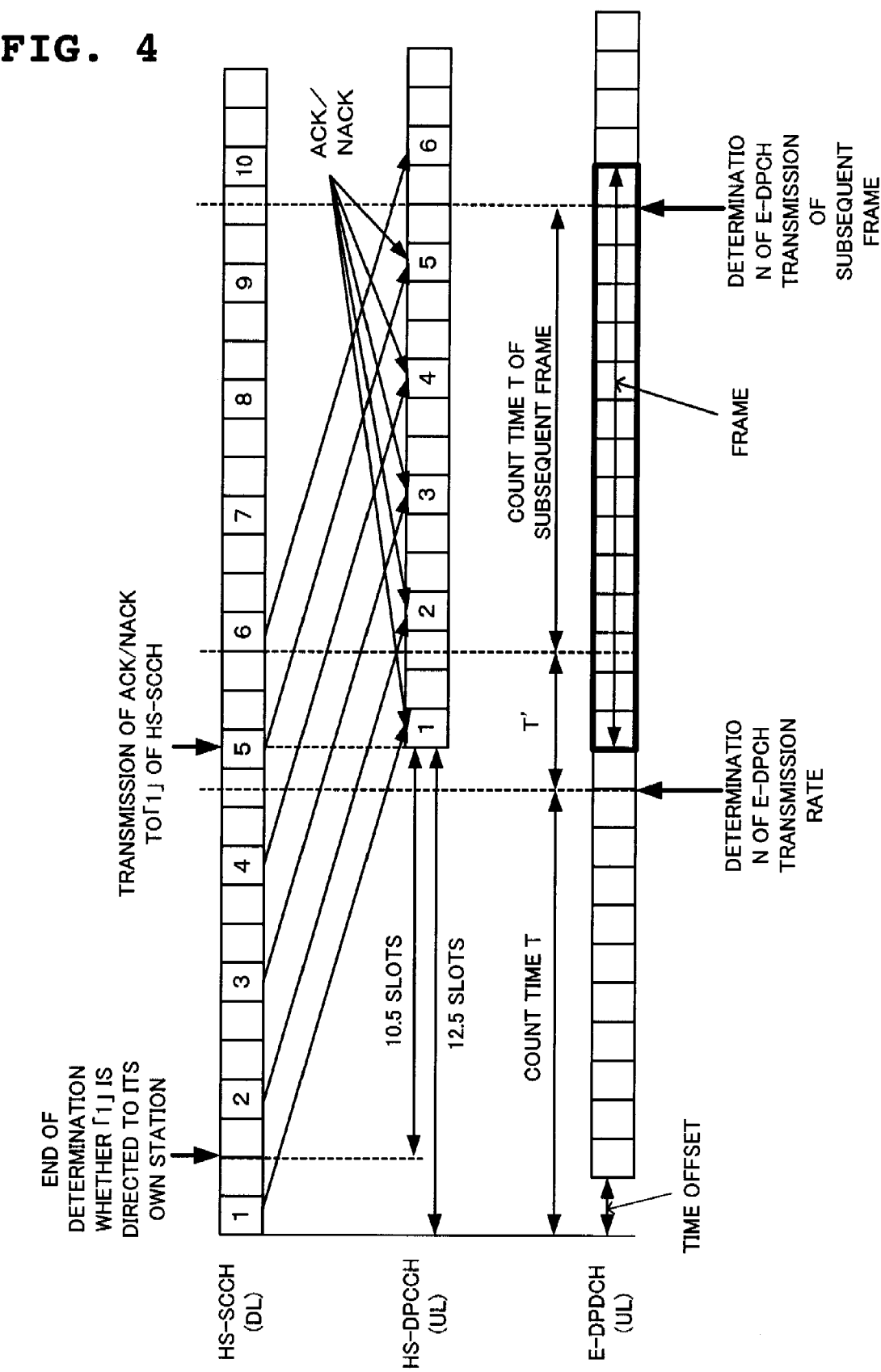
FIG. 4 is a diagram showing a time relationship of channels used in the mode of implementation of the present invention.

FIG. 4 is a diagram showing a time relationship of channels used in the mode of implementation of the present invention. Shown in FIG. 4 is transmission timing of each of HS-SCCH, HS-DPCCH and E-DPCH.

[1][2], . . . [10] of HS-SCCH represent a first slot of each HS-SCCH sub-frame. As described above, a control signal block contained in the first slot of HS-SCCH is masked with an ID of the mobile stations 2-1 to 2-3 as a destination of the control signal.

Accordingly, each of the mobile stations 2-1 to 2-3 receives the first slot of each HS-SCCH sub-frame to determine whether it is a downlink packet transmission notification signal directed to its own station or not according to whether the [control signal set 1] is obtained by removing, in the subsequent one slot, the masking by the ID of its own station. When determining that it is a downlink packet transmission notification signal directed to its own station, each of the mobile stations 2-1 to 2-3 receives one sub-frame of the HS-PDSCH whose transmission is started with a delay of two slots (illustration is omitted in the figure) to transmit the ACK/NACK signal in the sub-frame of the HS-DPCCH after about 7.5 slots after the reception of the HS-PDSCH sub-frame.

Accordingly, using a determination result of the downlink packet transmission notification signal of HS-SCCH enables each of the mobile stations 2-1 to 2-3 to predict whether transmission of the ACK/NACK signal will exist or not about 10.5 slots before transmission of the ACK/NACK signal. Therefore, each of the mobile stations 2-1 to 2-3 counts the number of the ACK/NACK transmissions in a subsequent E-DPCH frame by using the time difference based on a reception result of the first slot of HS-SCCH.

More specifically, among determination results [1] to [5] of HS-SCCH corresponding to the ACK/NACK fields [1] to [5] of HS-DPCCH, count the number of transmissions determined to be directed to its own station. As is clear from FIG. 4, due to a relationship of a time offset of transmission timing between HS-SCCH and E-DPCH, there exists an ACK/NACK by which no determination of HS-SCCH can be made before timing of determination of usable power for E-DPCH ([5] in FIG. 4).

In the mode of implementation of the present invention, therefore, the HS-SCCH from [1] to [4] excluding the HS-SCCH for such an ACK/NACK signal is considered as a target of count. In other words, the mobile stations 2-1 to 2-3 are set to count a number $N_{mine}$ of received downlink packet transmission notification signals directed to its own station within a count time T starting 12.5 slots to one slot before the subsequent E-DPCH frame starting timing. Then, by using a predetermined threshold value $N_{thr}$, required power $P_{d,HS}$ [dBm] which is ensured for HS-DPCCH is determined as follows in the subsequent E-DPCH frame:

$$N_{mine} \leq N_{thr} : P_{d,HS} = P_{d,DPCCH} + \Delta_{CQI}[\text{dBm}]$$

$$N_{mine} > N_{thr} : P_{d,HS} = P_{d,DPCCH} + \Delta_{max\text{-}HS}[\text{dBm}], \Delta_{max\text{-}HS} = \max(\Delta_{CQI}, \Delta_{ACK}, \Delta_{NACK})[\text{dB}]$$

Thereafter, as power $P_{w,EDCH}$[mW] which can be used for E-DPCH, the mobile stations 2-1 to 2-3 determine power obtained by subtracting required power $P_{w,DPCCH}$, $P_{w,DPDCH}$ and the determined $P_{w,HS}$[mW] of DPCCH, DPDCH and HS-DPCCH from the maximum power $P_{w,MAX}$[mW]. Here, when the first subscript is "w" as a manner of expressing a power value, $P_{w,name}$ is assumed to indicate a true value ([mW]) and when the first subscript is "d", $P_{d,name}$ is assumed to indicate a decibel value ([dBm]). Between these, the following conversion expression is applied:

$$P_{d,name}[\text{dBm}] = 10 \log(P_{w,name}[\text{mW}])$$

The foregoing is detailed content of the characteristic of the above i).

Furthermore, the base station 1 also counts the number of transmissions of the downlink packet transmission notification signal to the mobile stations 2-1 to 2-3 from [1] to [4] of HS-SCCH similarly to the above. In other words, the base station 1 counts the number $N_{MS\#m}$ of the downlink packet transmission notification signals transmitted to a mobile station #m within the count time T of each EUDCH mobile station (mobile station #m).

Then, when $N_{MS\#m} \leq N_{thr}$, refrain from transmitting the downlink packet transmission notification signal to the mobile station #m in a time T' before the subsequent count time start. As a result, since in a frame in which the mobile station fails to ensure required power of the ACK/NACK signal, no downlink packet transmission notification signal can be transmitted in the HS-SCCH frame at the timing at which the mobile station is not allowed to detect existence/non-existence of the ACK/NACK signal transmission, it is possible to prevent required power from exceeding maximum power due to ACK/NACK transmission which can not be expected by the mobile station. The foregoing is the detailed content of the characteristics of the above ii).

When the threshold value $N_{thr}$ is set to be not less than 1, although transmission of the ACK/NACK signal occurs $N_{mine}$ times, the required power of the ACK/NACK signal is not ensured when determining power used for E-DPCH. Accordingly, there occurs a case where the power might exceed maximum power at the transmission of the ACK/NACK signal which occurs $N_{mine}$ times. In such a case, the mobile station preferentially reduces power of E-DPCH. As a result, neither power of DPDCH nor that of HS-DPCCH will be reduced to avoid their deterioration.

In this case, reception quality of E-DPCH might be degraded, while the characteristics of i) of the present invention enables the number of occurrences of such condition to be suppressed below the $N_{thr}$ times. Setting the threshold value $N_{thr}$ to be a small value enables a rate of deterioration of E-DPCH to be reduced and even when reception data of E-DPCH is erroneous, only the number of HARQ (Hybrid Automatic Repeat Request) retransmissions will be slightly increased, so that effects exerted on a throughput of E-DPCH can be minimized. The foregoing is the detailed content of the characteristic of the above iii).

Thus, in the present embodiment, use of the mobile stations 2-1 to 2-3 and the base station 1 having thus described characteristics enables power for transmission of the ACK/NACK signal to be ensured in a frame in which transmission of the ACK/NACK signal occurs the number of times equal to or more than a threshold value, resulting in reducing power accordingly which can be used for E-DPCH. Therefore, in the mode of implementation of the present invention, a probability that a total of required power will exceed maximum power at the transmission of the ACK/NACK signal is reduced to decrease a rate of erroneous reception of uplink channels (DPCCH, DPDCH, HS-DPCCH, EUDCH). As a result, it is possible by the mode of implementation of the present invention to avoid line connection caused by a reception error of a control signal of an upper layer or a transmission delay increase, useless retransmission, a transmission delay increase and the like caused by a reception error of a control signal of HSDPA.

In addition, while in the mode of implementation of the present invention, reduction in power which can be used for E-DPCH leads to reduction in a transmission rate of E-DPCH, a reception error rate of E-DPCH is also decreased to reduce the number of retransmissions by HARQ, resulting in decreasing a transmission delay.

Furthermore, as to transmission of the ACK/NACK signal whose existence/non-existence can not be detected by the mobile stations 2-1 to 2-3, the mode of implementation of the present invention enables the HSDPA scheduler of the base station 1 to execute scheduling taking it into consideration. Accordingly, in the mode of implementation of the present invention, when the mobile stations 2-1 to 2-3 fail to ensure power required for transmission of the ACK/NACK signal, no transmission of the ACK/NACK signal will occur at such timing, so that further reduction is possible in a probability that a total of required power will exceed maximum power.

Moreover, the threshold value $N_{thr}$ can be set to a value not less than 1. With the threshold value $N_{thr}$ set to 0, even when the ACK/NACK signal is transmitted only once within one frame, transmission power for the ACK/NACK signal will be ensured and in this case, 14 slots out of one frame (15 slots) use only a part of the ensured power which power accordingly will not be used for E-DPCH. This is low-efficient power use which has a possibility of inviting a decrease in a system throughput.

On the other hand, with the threshold value $N_{thr}$ set to be small not less than 1, when the ACK/NACK signal transmission occurs only a few times, without ensuring transmission power for the ACK/NACK signal, increasing power which can be used for E-DPCH accordingly enables selection up to a high transmission rate. The mode of implementation of the present invention therefore enables a throughput of E-DPCH to be improved more.

Figure 5:
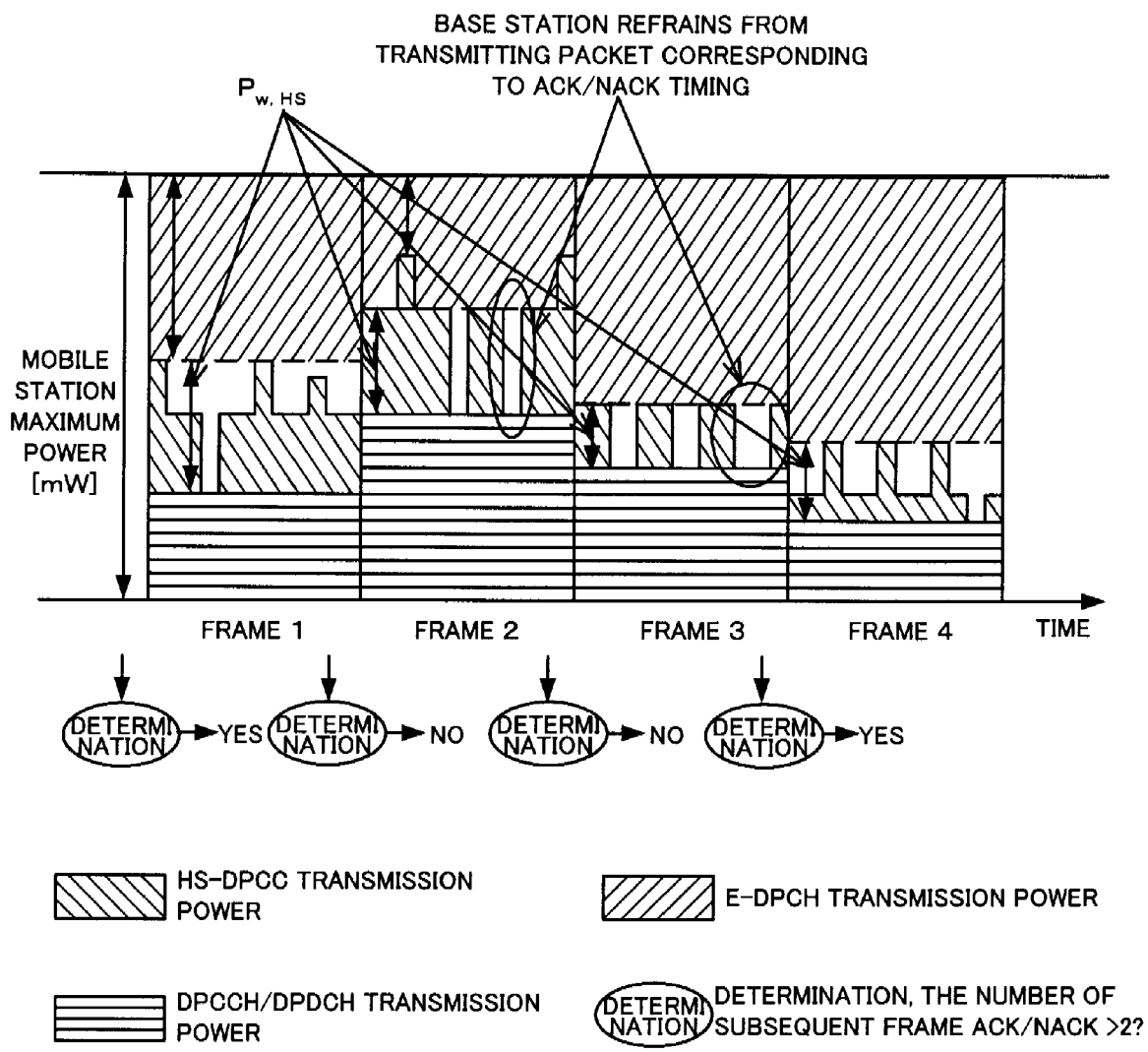
FIG. 5 is a diagram showing power variation of a channel in the mode of implementation of the present invention.

FIG. 5 is a diagram showing power variation of a channel in the mode of implementation of the present invention. Shown in FIG. 5 is a time variation of transmitted power obtained when the above-described operation is applied. Here, the threshold value $N_{thr}$ is set to 2. The mobile stations 2-1 to 2-3 determine whether a count result in the count time T is not less than the threshold value $N_{thr}$ immediately before start of each frame and when the determination result is YES (frame 1, frame 4), with required power $P_{w,HS}$ [mW] of HS-DPCCH as:

$$P_{W,HS}[mW] = 10^{\frac{P_{d,DPCCH}+\Delta_{max-HS}}{10}}$$

and when the determination result is No (frame 2, frame 3), with required power $P_{w,HS}$ [mW] of HS-DPCCH as:

$$P_{W,HS}[mW] = 10^{\frac{P_{d,DPCCH}+\Delta_{CQI}}{10}}$$

calculate power which can be used for E-DPCH in the subsequent frame and determine a transmission rate of E-DPCH based on the calculation.

In addition, since in the frame 2 and the frame 3, the required power of the ACK/NACK signal might not be ensured at the mobile stations 2-1 to 2-3, the HSDPA scheduler of the base station 1 refrains from packet transmission corresponding to timing at which the mobile stations 2-1 to 2-3 are not allowed to detect existence/non-existence of transmission of the ACK/NACK signal.

Moreover, although in the frame 2, a total of required power exceeds the maximum power at the transmission of the ACK/NACK signal, the mobile stations 2-1 to 2-3 adjust the power to be the maximum power by preferentially reducing E-DPCH to be $P'_{w,EDPCH}$ ($<P_{w,EDPCH}$).

More specifically, since the mode of implementation of the present invention enables power which can be used for uplink packet transmission to be increased while reducing a probability that a total of required power of the uplink will exceed the maximum power of the mobile stations 2-1 to 2-3 due to transmission of the ACK/NACK signal of the downlink packet, reception quality of a channel other than that for uplink packet transmission can be improved and also a throughput of the uplink packet transmission can be effectively increased.

EMBODIMENT 1

Figure 6:
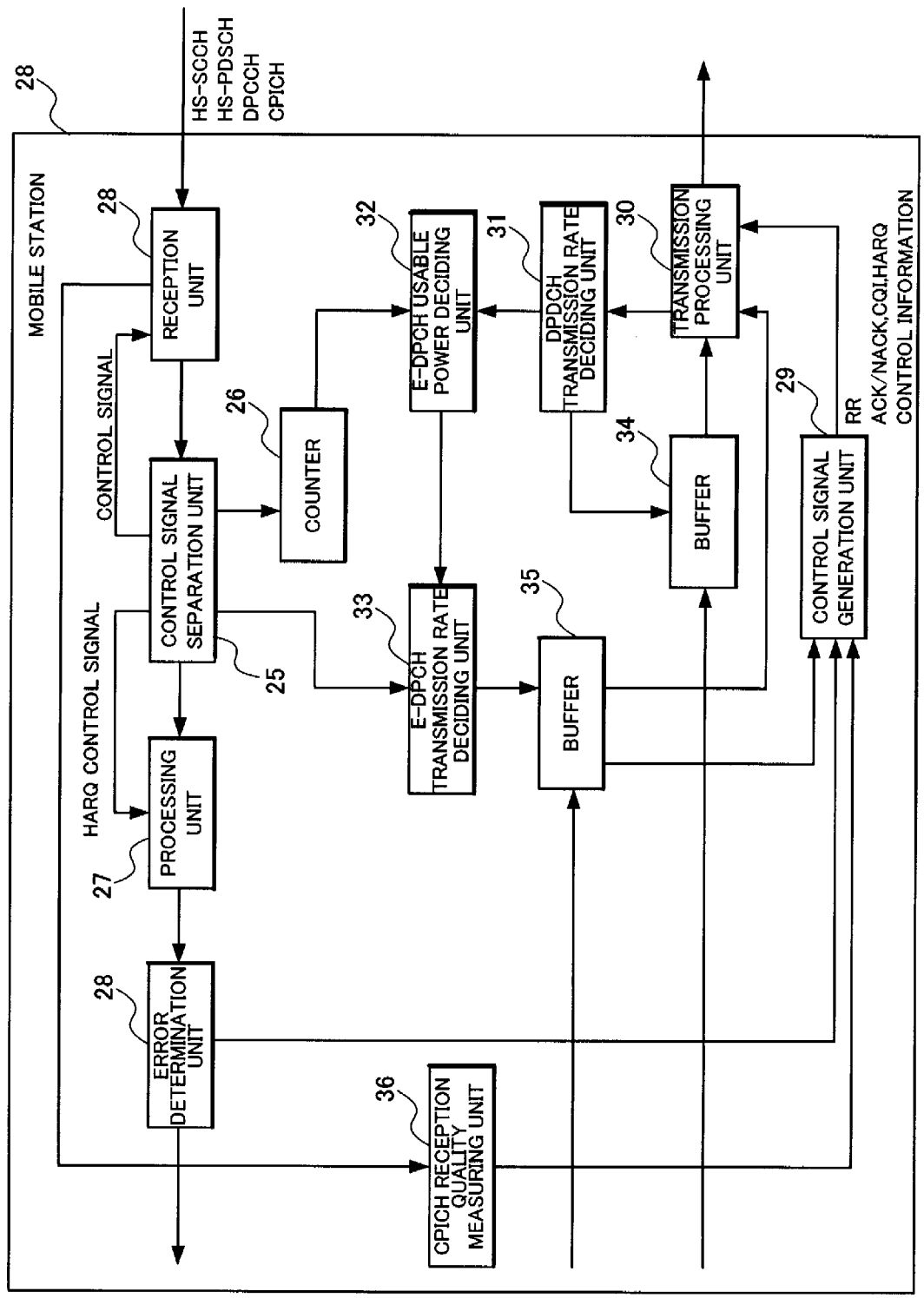
FIG. 6 is a block diagram showing a structure of a mobile station according to one embodiment of the present invention.

Next, an embodiment of the present invention will be described with reference to the drawings. FIG. 6 is a block diagram showing a structure of a mobile station according to one embodiment of the present invention. In FIG. 6, a mobile station 2 according to one embodiment of the present invention includes a reception unit 24, a control signal separation unit 25, a counter 26, a processing unit 27, an error determination unit 28, a control signal generation unit 29, a transmission processing unit 30, a DPDCH transmission rate deciding unit 31, an E-DPCH usable power deciding unit 32, an E-DPCH transmission rate deciding unit 33, buffers 34 and 35 and a CPICH reception quality measuring unit 36.

The reception unit 24 receives DPCCH, HS-SCCH and E-DPCCH and subjects the same to inversely spreading, from which a control signal is separated at the control signal separation unit 25. At this time, the control signal separation unit 25 removes the masking applied to HS-SCCH by using the mobile station ID of its own station and determines whether it is a control signal directed to its own station to notify the counter 26 of the determination result.

When determining that it is directed to its own station, the control signal separation unit 25 sends information such as a modulation and the number of codes contained in the first slot of HS-SCCH to the reception unit 24 and sends HARQ control information contained in the second and third slots to the processing unit 27. Furthermore, the control signal separation unit 25 sends an RG signal contained in E-DPCCH to the E-DPCH transmission rate deciding unit 33.

Based on the information such as a modulation and the number of codes received from the control signal separation unit 25, the reception unit 24 receives the corresponding HS-PDSCH and subjects the same to inverse spreading to send the result to the processing unit 27 through the control signal separation unit 25. The processing unit 27 executes decoding processing based on the HARQ control signal information received from the control signal separation unit 25 and the error determination unit 28 determines whether a data error exists or not from CRC (Cyclic Redundancy Check). The error determination unit 28 sends the determination result to the control signal generation unit 29, so that the control signal generation unit 29 generates the ACK/NACK signal and sends the same to the transmission processing unit 30.

The counter 26 counts the number of transmissions of the ACK/NACK signal occurring in the subsequent E-DPCH frame. More specifically, based on a determination result of HS-SCCH received within the count time T which has been described with reference to FIG. 4, count the number of downlink packet transmission notification signals transmitted to its own station during the time. When the count time T ends, the counter 26 sends the count result to the E-DPCH usable power deciding unit 32 to reset the count value.

Furthermore, the transmission processing unit 30 periodically sends information about a current DPDCH transmission rate and its required transmission power to the DPDCH transmission rate deciding unit 33, so that the DPDCH transmission rate deciding unit 33 decides a transmission rate at which transmission is allowed with currently usable power based on these information. The DPDCH transmission rate deciding unit 33 further decides a DPDCH transmission rate in a subsequent frame among transmission rates enabling transmission based on the volume of data accumulated in the buffer 34 for DPDCH. Thereafter, the DPDCH transmission rate deciding unit 33 notifies the E-DPCH usable power deciding unit 32 of the decided transmission rate, its required power of DPDCH and information about required power of DPCCH.

The E-DPCH usable power deciding unit 32 decides, as usable power of E-DPCH, remaining power obtained by subtracting the notified required power $P_{w,DPDCH}$, $P_{w,DPCCH}$ and $P_{w,HS}$[mW] of DPDCH, DPCCH and HS-DPCCH from the maximum power $P_{w,max}$[mW]. At this time, the required power of HS-DPCCH is decided by using the method described above with reference to FIG. 4 and FIG. 5 based on information about the number of transmissions of the ACK/NACK signal occurring in the subsequent E-DPCCH frame notified by the counter 26. Thereafter, the E-DPCH usable power deciding unit 32 notifies the E-DPCH transmission rate deciding unit 33 of the decided E-DPCH usable power.

The E-DPCH transmission rate deciding unit 33 receives information about the E-DPCH usable power and the RG signal to update a pointer based on the RG and further selects a transmission rate which is not more than the maximum transmission rate indicated by the pointer and whose required power is not more than the E-DPCH usable power to consider the selected rate as a transmission rate of E-DPCH in the subsequent frame.

The information of the DPDCH transmission rate and the E-DPCH transmission rate decided by the DPDCH transmission rate deciding unit 31 and the E-DPCH transmission rate deciding unit 33 are notified to each of the buffers 34 and 35, respectively, so that a data block of a size corresponding to the transmission rate is sent from among the data accumulated in the respective buffers 34 and 35 to the transmission processing unit 30.

In addition, the buffer 35 cyclically sends information about a current volume of accumulated data and a maximum transmission rate to the control signal generation unit 29, so that the control signal generation unit 29 generates an RR signal based on these information in a manner as described above with reference to FIG. 4 and sends the generated signal to the transmission processing unit 30.

Furthermore, the CPICH reception quality measuring unit 36 cyclically receives a reception quality measurement value of CPICH from the reception unit 24 and notifies the control signal generation unit 29 of a mean value of a predetermined time. The control signal generation unit 29 generates a CQI signal as a downlink reception quality notification signal from mean reception quality of CPICH and sends the signal to the transmission processing unit 30.

The transmission processing unit 30 subjects the received DPDCH and E-DPCH data blocks and the control signals received from the control signal generation unit 29 to necessary processing such as coding, rate matching, interleaving and spreading and transmits the result with codes multiplexed.

Figure 7:
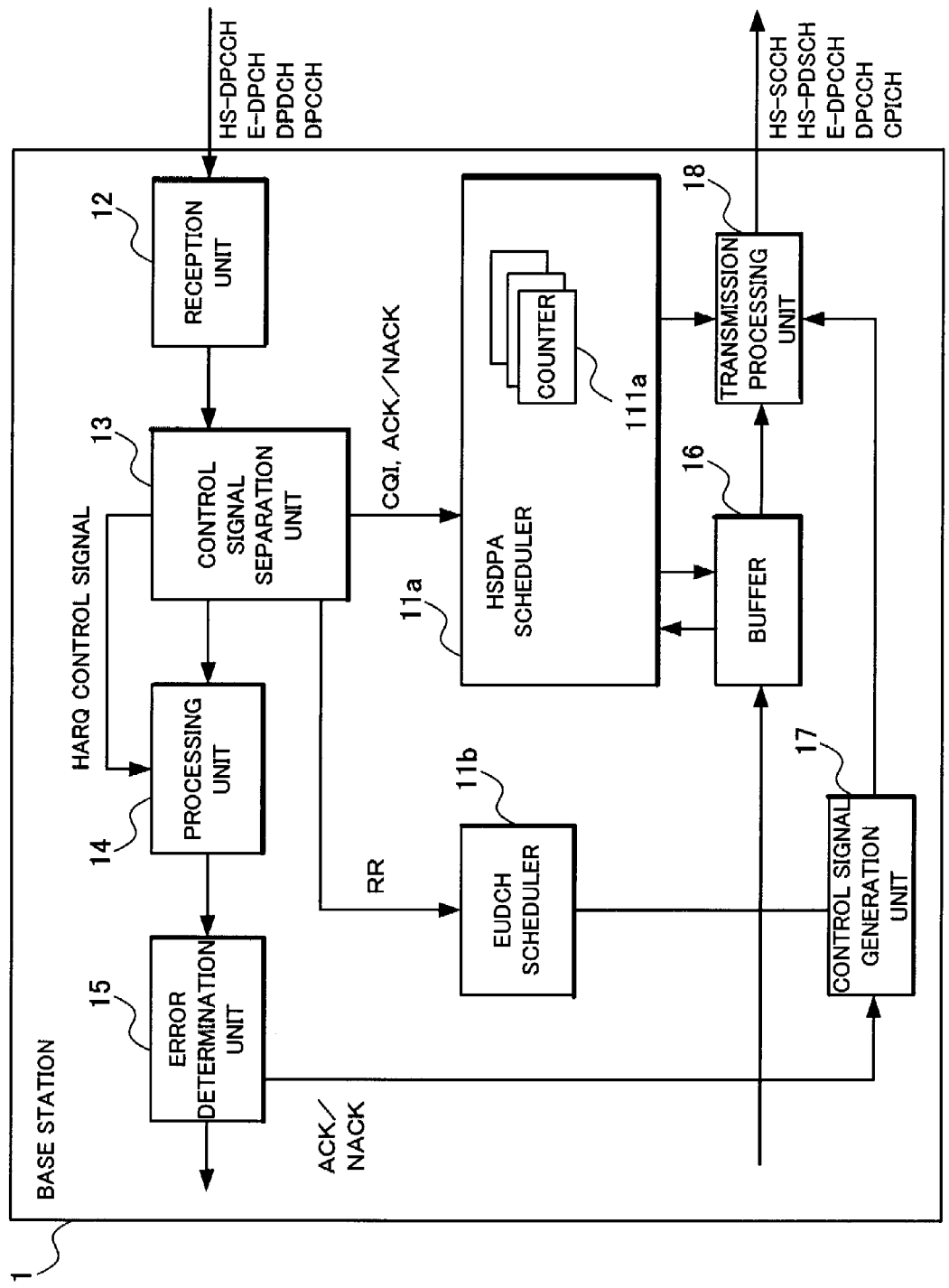
FIG. 7 is a block diagram showing a structure of a base station according to one embodiment of the present invention.

FIG. 7 is a block diagram showing a structure of a base station according to one embodiment of the present invention. In FIG. 7, the base station 1 according to one embodiment of the present invention includes a reception unit 12, a control signal separation unit 13, an HSDPA scheduler 11a, an EUDCH scheduler 11b, a processing unit 14, an error determination unit 15, a buffer 16, a control signal generation unit 17 and a transmission processing unit 18.

The reception unit 12 receives HS-DPCCH, E-DPCH, DPDCH and DPCCH and subjects them to inverse spreading to send the result to the control signal separation unit 13. The control signal separation unit 13 separates data and a control signal, sends data contained in the DPDCH and E-DPCH, the HARQ control signal of the E-DPCH and DPDCH transmission rate information contained in the DPCCH to the processing unit 14, and sends the ACK/NACK signal and the CQI signal contained in the HS-DPCCH to the HSDPA scheduler 11a and the RR signal to the EUDCH scheduler 11b.

The processing unit 14 executes decoding processing of E-DPCH and DPDCH by using the HARQ information and the DPDCH transmission rate information and the error determination unit 15 makes error determination by using a CRC. Thereafter, the determination result of E-DPCH is sent to the control signal generation unit 17, so that the control signal generation unit 17 generates the ACK/NACK signal and sends the same to the transmission processing unit 18.

On the other hand, the HSDPA scheduler 11a receives the CQI signal and the ACK/NACK signal from the control signal separation unit 13 to schedule packet transmission based on these information and the volume of data accumulated in the buffer 16. Any scheduling method may be used as a scheduling method used in this case such as a method of assigning transmission occasions in order, a method of assigning transmission occasions in descending order of reception quality, or an intermediate method between the two methods. Thereafter, the HSDPA scheduler 11a sends scheduling information to the buffer 16, so that a data block is accordingly sent from the buffer 16 to the transmission processing unit 18.

In addition, the HSDPA scheduler 11a includes a counter 111a provided for each of the mobile stations 2-1 to 2-3 to count the number of downlink packet transmission notification signals transmitted to the mobile stations 2-1 to 2-3 within the count time T of each of the mobile stations 2-1 to 2-3. Then, based on a count result, determine whether a packet transmission notification can be transmitted to the mobile stations 2-1 to 2-3 during the time T' before the subsequent count time starts or not according to the method described above with reference to FIG. 4 and FIG. 5. After the determination, the counter 111a has its count number reset.

On the other hand, the EUDCH scheduler 11b receives the RR signal from the control signal separation unit 13 to execute scheduling such that a noise rise goes not more than the threshold value. Any scheduling method may be used in this case such as a method of allowing a transmission rate increase request in order, a method of allowing a transmission rate increase request in descending order of reception quality, or an intermediate method between the two methods. Thereafter, the EUDCH scheduler 11b sends the scheduling information to the control signal generation unit 17, so that the control signal generation unit 17 generates an RG signal based on the information and sends the same to the transmission processing unit 18.

In addition, the control signal generation unit 17 cyclically generates a predetermined bit series for a pilot signal to be transmitted by CPICH and sends the same to the transmission processing unit 18. The transmission processing unit 18 subjects the HSDPA data block received from the buffer 16 and the control signal received from the control signal generation unit 17 to necessary processing such as decoding, rate matching, interleaving and spreading and transmits the obtained result with codes multiplexed.

Figure 8:
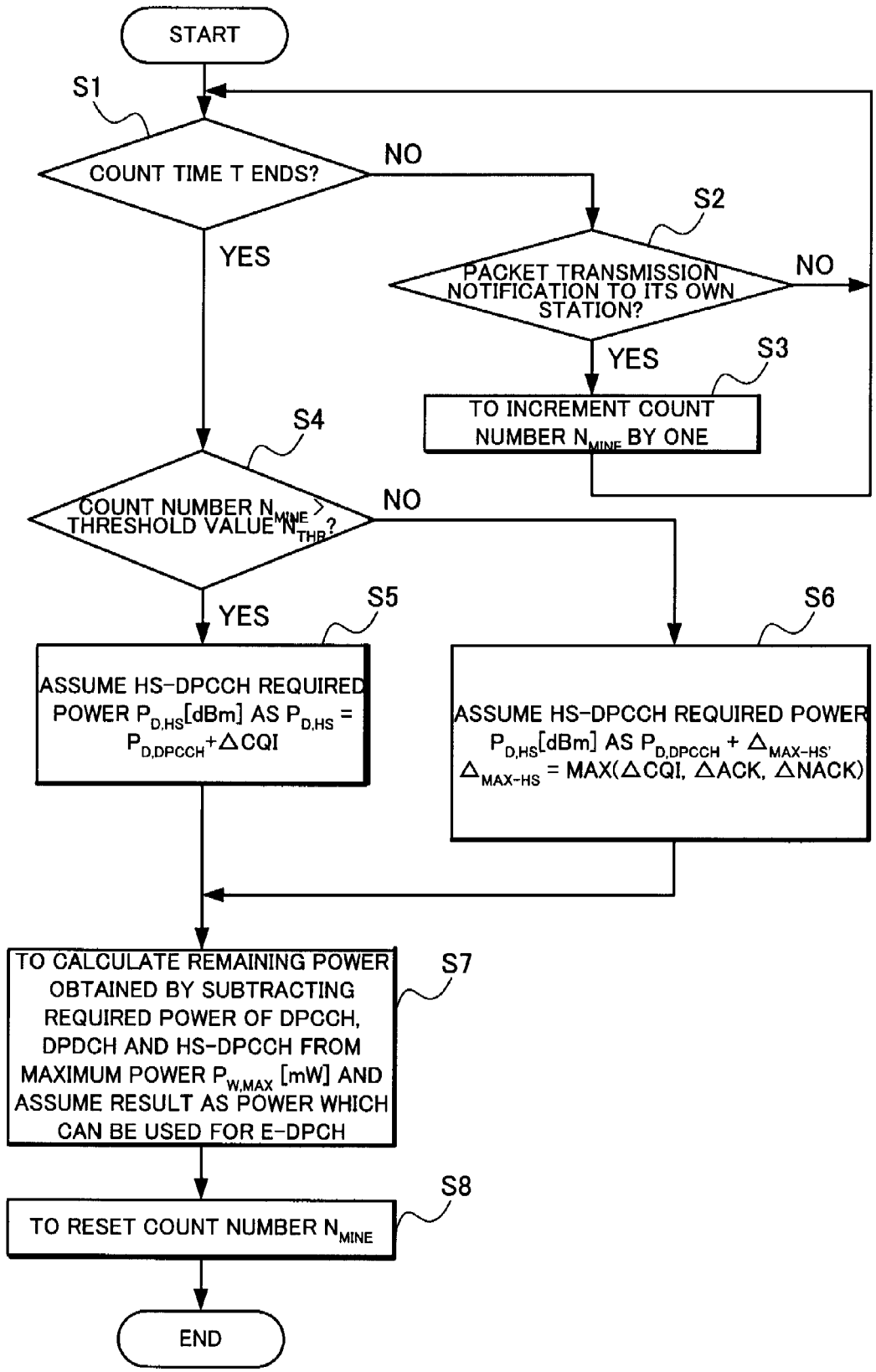
FIG. 8 is a flow chart showing processing of determining power which can be used for E-DPCH at the mobile station according to one embodiment of the present invention.

FIG. 8 is a flow chart showing processing of determining power which can be used for E-DPCH at the mobile station 2 according to one embodiment of the present invention. Shown in FIG. 8 is the processing executed until power which can be used for E-DPCH in a subsequent frame is determined by the mobile station 2. When the mobile station 2 is structured to include a CPU (Central Processing Unit), a ROM (Read Only Memory) for storing a program to be executed on the CPU and a RAM (Random Access Memory) used as a working region of the CPU, the above processing shown in FIG. 8 is realized by executing the program of the ROM expanded to the RAM by the CPU.

The mobile station 2 determines whether it is within the count time T (12.5 slots to 1 slot before the start timing of the subsequent frame) (Step S1 in FIG. 8) and when it is within the count time T (Step S2 in FIG. 8), increments the count number $N_{mine}$ by one upon receiving a downlink packet transmission notification signal directed to its own station (Step S3 in FIG. 8).

When the count time T ends (Step S2 in FIG. 8), the mobile station 2 compares the count value $N_{mine}$ with the threshold value $N_{thr}$ notified in advance by the base station control device 3 (Step S4 in FIG. 8) and when the count number $N_{mine}$ is larger, decides the required power $P_{d,HS}$[dBm] of HS-DPCCH to be as follows (Step S5 in FIG. 8):

$$P_{d,HS}=P_{d,DPCCH}+\Delta_{CQI}$$

When the count number $N_{mine}$ is smaller, the mobile station 2 sets the required power $P_{d,HS}$[dBm] of HS-DPCCH to be as follows:

$$P_{d,HS}=P_{d,DPCCH}+\Delta_{max-HS}$$

$$\Delta_{max-HS}=\max(\Delta_{CQI},\Delta_{ACK},\Delta_{NACK})$$

Here, $\Delta_{max-HS}$ is assumed to be the maximum power offset among $\Delta_{CQI}$, $\Delta_{ACK}$ and $\Delta_{NACK}$ (Step S6 in FIG. 8).

Thereafter, the mobile station 2 calculates remaining power which is obtained by subtracting the required power $P_{w,DPCCH}$, $P_{w,DPDCH}$ and $P_{w,HS}$ [mW] of DPCCH, DPDCH and HS-DPCCH from the maximum power $P_{w,MAX}$ [mW] to determine power which can be used for E-DPCH (Step S7 in FIG. 8). Thereafter, the mobile station 2 resets the count number $N_{mine}$ to 0 (Step S8 in FIG. 8).

The mobile station 2 executes the above operation for each E-DPCH frame and selects a transmission rate whose required power is not more than the power which can be used for E-DPCH to transmit E-DPCH in the subsequent frame.

Figure 9:
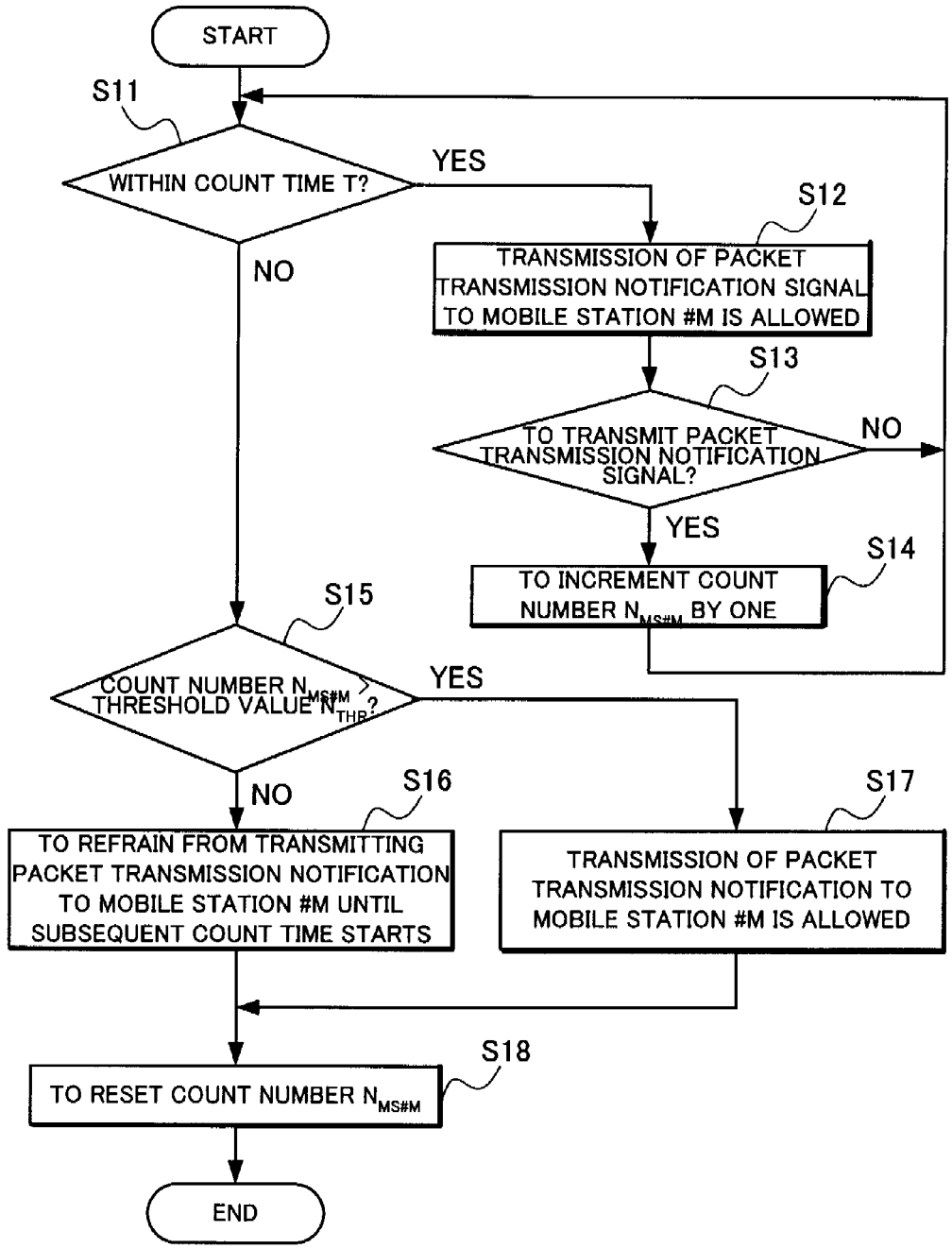
FIG. 9 is a flow chart showing processing of determining whether downlink packet transmission is allowed or not at the base station according to one embodiment of the present invention.
Figure 10:
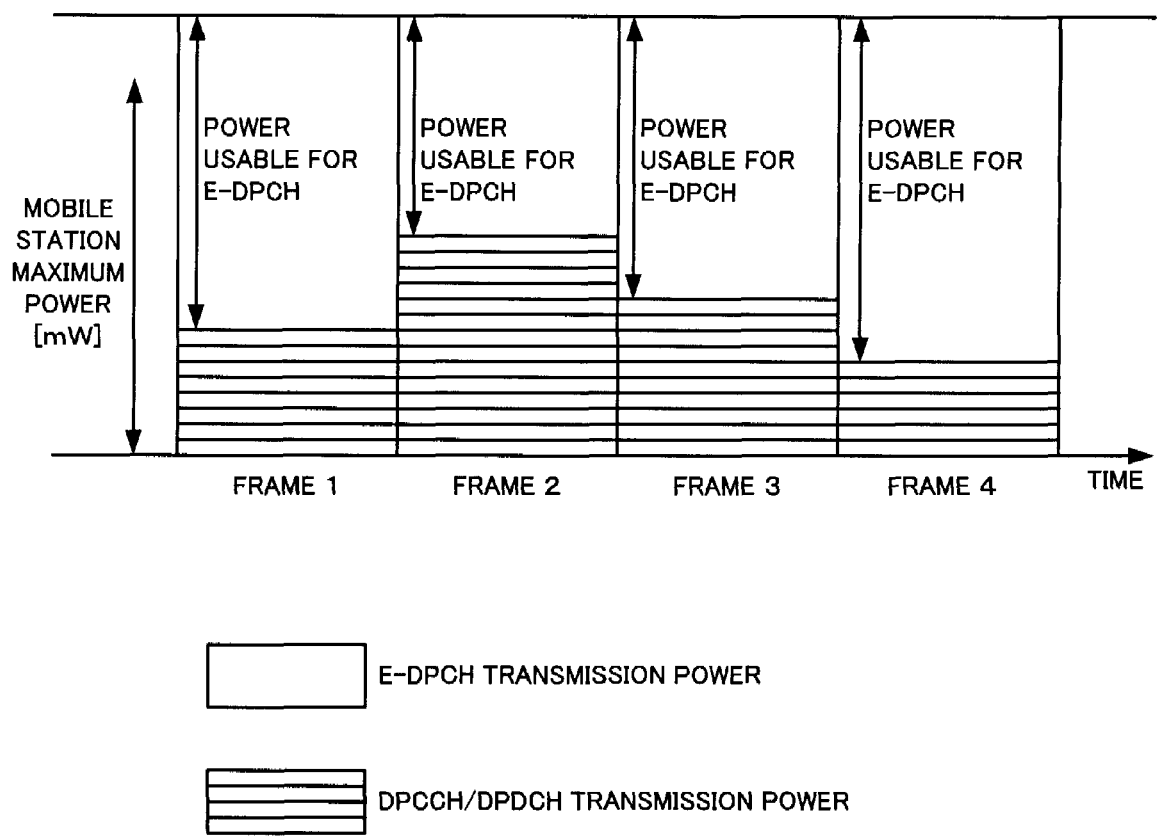
FIG. 10 is a diagram for use in explaining a method of determining power which can be used for E-DPCH in conventional art.
Figure 11:
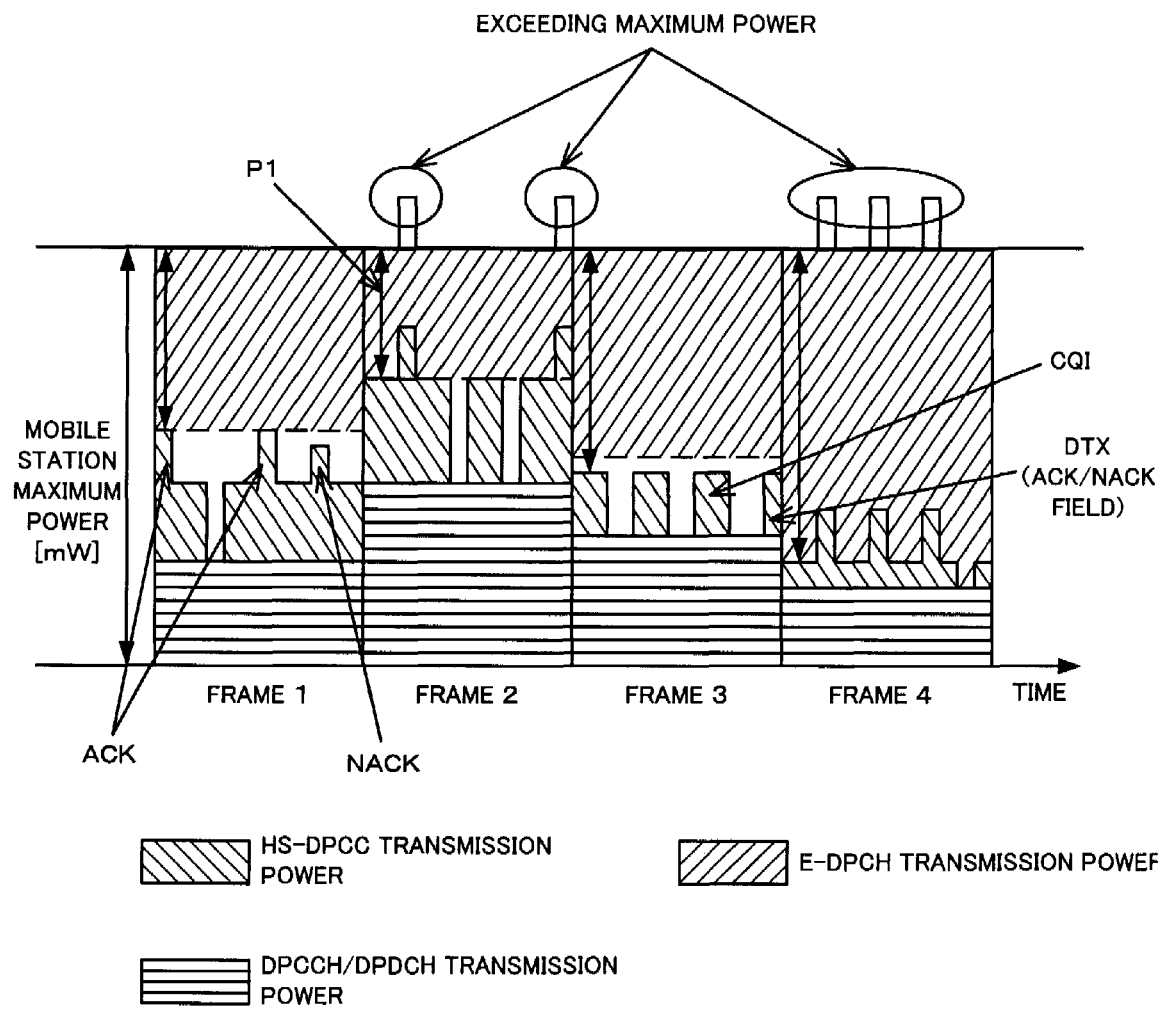
FIG. 11 is a diagram for use in explaining a problem in conventional art.

FIG. 9 is a flow chart showing processing of determining whether downlink packet transmission is allowed or not at the base station 1 according to one embodiment of the present invention. Shown in FIG. 9 is the processing of determining whether transmission of a downlink packet transmission notification signal to the mobile station #m is allowed or not by the base station 1. When the base station 1 is structured to include a CPU, a ROM for storing a program to be executed on the CPU and a RAM used as a working region of the CPU, the above processing shown in FIG. 9 is realized by executing the program of the ROM expanded to the RAM by the CPU.

The base station 1 determines whether it is within the count time T (Step S11 in FIG. 9) and when it is within the count time (Step S11 in FIG. 9), transmission of the downlink packet transmission notification signal to the mobile station #m is allowed (Step S12 in FIG. 9). When transmitting the downlink packet transmission notification signal (Step S13 in FIG. 9), the base station 1 increments a count number $N_{MS\#m}$ by one (Step S14 in FIG. 9).

When not within the count time (Step S11 in FIG. 9), the base station 1 compares the count value $N_{MS\#m}$ with the threshold value $N_{thr}$ notified in advance by the base station control device 3 and when $N_{MS\#m}$ is smaller (Step S15 in FIG. 9), refrain from transmitting the downlink packet transmission notification signal to the mobile station #m until the subsequent count time starts (Step S16 in FIG. 9). In other cases, the downlink packet transmission notification signal may be transmitted (Step S17 in FIG. 9). Thereafter, the base station 1 resets the count number $N_{MS\#m}$ (Step S18 in FIG. 9).

The base station 1 executes the above operation for each E-DPCH frame and when transmission of the downlink packet transmission notification signal is allowed, considers the station as a target of HSDPA scheduling. Otherwise, count the relevant mobile stations 2-1 to 2-3 out as a target of HSDPA scheduling.

While in the present invention, the same value is used as the threshold value $N_{thr}$ both in the mobile station 2 and the base station 1, it is not limited thereto and different threshold values may be set at the mobile station 2 and the base station 1.

In addition, while in the present invention, the CQI signal is transmitted on a sub-frame basis, it is not limited thereto and it may be intermittently transmitted according to a cycle set by the network in advance. In this case, in a frame whose count number $N_{MS\#m}$ is not more than the threshold value and in which no CQI signal transmission exists, required power of HS-DPCCH may be set to 0 [mW].

Furthermore, while in the present invention, TTI of an individual channel and that of a channel related to EUDCH are assumed to be one frame, they are not limited thereto. For example, TTI of a channel related to EUDCH may be one sub-frame and TTI of E-DPCH and E-DPCCH may be different from each other.

Thus, according to the present embodiment, when transmission of the ACK/NACK signal occurs more than the number of the threshold value in a subsequent transmission time unit, power for transmitting the ACK/NACK signal is ensured to enable reduction in power which can be used for E-DPCH accordingly. The present embodiment therefore enables reduction in a probability that a total of required power will exceed the maximum power at the time of transmission of the ACK/NACK signal to decrease a reception error rate of uplink channels (DPCCH, DPDCH, HS-DPCCH and EUDCH). As a result, the present embodiment makes it possible to avoid line connection caused by erroneous reception of a control signal of an upper layer or a transmission delay increase, useless retransmission, an increase in a retransmission delay and the like due to an HSDPA control signal reception error.

While in the present embodiment, reduction in power which can be used for E-DPCH leads to reduction in an E-DPCH transmission rate, an E-DPCH reception error rate can be also reduced, so that the number of retransmissions by HARQ can be decreased, resulting in enabling reduction in a transmission delay.

Furthermore, as to ACK/NACK transmission whose occurrence/non-occurrence can not be detected by the mobile station 2, the HSDPA scheduler 11a of the base station 1 is allowed to execute scheduling taking it into consideration. Thus, when the mobile station 2 fails to ensure required power of the ACK/NACK transmission, no transmission of the ACK/NACK signal will occur at such timing, thereby further reducing a probability that a total of required power will exceed the maximum power.

Also possible is setting the threshold value $N_{thr}$ to be a value not less than 1. Setting the threshold value $N_{thr}$ to 0 results in obtaining transmission power for the ACK/NACK signal even when the ACK/NACK signal is transmitted only once in one TTI. In a case where TTI of a transmission time unit is one frame, for example, 14 out of 15 slots use only a part of the ensured power which power accordingly can not be used for E-DPCH. This is low-efficient power use which has a possibility of inviting a reduction in a system throughput.

On the other hand, with the threshold value $N_{thr}$ set to be a small value not less than 1, when transmission of the ACK/NACK signal occurs a few times, without ensuring transmission power for the ACK/NACK signal, power which can be used for E-DPCH can be accordingly increased to enable selection up to a high transmission rate. As a result, the present embodiment enables improvement of a throughput of E-DPCH.

More specifically, since the present embodiment enables power which can be used for uplink packet transmission to be increased while reducing a probability that a total of required power of the uplink will exceed the maximum power of the mobile station 2 due to transmission of the ACK/NACK signal of a downlink packet, it is possible to improve reception quality of a channel other than those of uplink packet transmission and effectively increase a throughput of uplink packet transmission.

Thus structured to operate as described in the following, the present invention obtains the effect of improving reception quality of DPDCH and HS-DPCCH and increasing a throughput of E-DPCH

The invention claimed is:

1. A radio communication system for high-speed packet transmission on an uplink and a downlink between a base station and a mobile station, in which
said base station comprises:
a first transmission processing unit which transmits a downlink packet transmission notification signal to the mobile station and a second transmission processing unit which transmits a corresponding downlink packet to the mobile station after a predetermined time after the transmission of the downlink packet transmission notification signal; and
said mobile station comprises:
a reception unit which, upon receiving the downlink packet transmission notification signal from said base station directed to said mobile station, receives the corresponding downlink packet,
a first deciding unit which, for each transmission time unit of first channel of the uplink, determines a power to be used in the transmission time unit according to a number of downlink packet transmission notification signals directed to said mobile station which have been received in a first predetermined time interval prior to the transmission time unit;
a second deciding unit which determines a transmission rate of the first channel based on the power to be used; and
a transmission processing unit which transmits an uplink packet by the first channel by using the determined transmission rate after the determination of the transmission rate of the first channel and transmits a reception result notification signal of the corresponding downlink packet by a second channel of the uplink;
wherein said first deciding unit considers the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

2. The radio communication system according to claim 1, wherein said mobile station reduces a power of only said first channel when the required transmission power of said uplink exceeds the maximum power of said mobile station.

3. The radio communication system according to claim 1, wherein said base station determines whether transmission of the corresponding downlink packet to said mobile station is allowed or not according to the number of transmissions of said downlink packet transmission notification signal which is transmitted to said mobile station in said first predetermined time interval.

4. The radio communication system according to claim 3, wherein said base station refrains from transmitting the packet transmission notification signal to said mobile station in a second predetermined time interval after said first predetermined time interval when the number of transmissions of said downlink packet transmission notification signal which is transmitted to said mobile station in said first predetermined time interval is larger than a second predetermined threshold value.

5. The radio communication system according to claim 1, wherein said mobile station transmits a third channel of said uplink and controls a transmission power of said third channel to meet a required quality by closed-loop type transmission power control to consider the power obtained by adding a predetermined power offset to the power of said third channel as the required transmission power of said reception result notification signal.

6. The radio communication system according to claim 1, wherein said first deciding unit considers the remaining power obtained by subtracting the required transmission power of said reception result notification signal from the maximum power of said mobile station as the power to be used for said first channel when the number of receptions of the downlink packet transmission notification signal directed to said mobile station which is received in said first predetermined time interval is one or more.

7. The radio communication system according to claim 4, wherein said base station refrains from transmitting the packet transmission notification signal to said mobile station in the second predetermined time interval after said first predetermined time interval when the number of transmissions of the downlink packet transmission notification signal which is transmitted to said mobile station in said first predetermined time interval is one or more.

8. A mobile station for high-speed packet transmission on an uplink and a downlink provided between the mobile station and a base station, comprising:

a reception unit which, upon receiving a downlink packet transmission notification signal directed to said mobile station, receives a corresponding downlink packet;

a first deciding unit which, for each transmission time unit of a first channel of the uplink, determines a power to be used in the transmission time unit according to a number of downlink packet transmission notification signals directed to said mobile station which have been received in a first predetermined time interval prior to the transmission time unit;

a second deciding unit which determines a transmission rate of the first channel based on the power to be used; and a transmission processing unit which transmits an uplink packet by the first channel by using the determined transmission rate and transmitting a reception result notification signal of the corresponding downlink packet by a second channel of the uplink, wherein said first deciding unit considers the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

9. The mobile station according to claim 8, which reduces a power of only said first channel when the required transmission power of said uplink exceeds the maximum power of said mobile station.

10. The mobile station according to claim 8, which transmits a third channel of said uplink and controls a transmission power of said third channel to meet a required quality by closed-loop type transmission power control to consider the power obtained by adding a predetermined power offset to the power of said third channel as the required transmission power of said reception result notification signal.

11. The mobile station according to claim 8, wherein said first deciding unit considers the remaining power obtained by subtracting the required transmission power of said reception result notification signal from the maximum power of said mobile station as the power to be used for said first channel when the number of receptions of the downlink packet transmission notification signal directed to said mobile station which is received in said first predetermined time interval is one or more.

12. A radio communication system controlling method of controlling a radio communication system for high-speed packet transmission on an uplink and a downlink between a base station and a mobile station, in which said base station transmits a downlink packet transmission notification signal and transmits a corresponding downlink packet to said mobile station after a predetermined time after the transmission of the downlink packet transmission notification signal, and said mobile station, upon receiving the downlink packet transmission notification signal directed to said mobile station, receives the corresponding downlink packet, determines, for each transmission time unit of a first channel of the uplink, a power to be used in the transmission time unit according to a number of downlink packet transmission notification signals directed to said mobile station which have been received in a first predetermined time interval prior to the transmission time unit, determines a transmission rate of the first channel based on the power to be used, transmits an uplink packet by the first channel by using the determined transmission rate after the determination of the transmission rate of the first channel and transmits a reception result notification signal of the corresponding downlink packet by a second channel of the uplink, wherein said mobile station considers the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

13. The radio communication system controlling method according to claim 12, wherein said mobile station reduces a power of only said first channel when the required transmission power of said uplink exceeds the maximum power of said mobile station.

14. The radio communication system controlling method according to claim 12, wherein said base station determines whether transmission of the corresponding downlink packet to said mobile station is allowed or not according to the number of transmissions of said downlink packet transmission notification signal which is transmitted to said mobile station in said first predetermined time interval.

15. The radio communication system controlling method according to claim 14, wherein said base station refrains from transmitting the packet transmission notification signal to said mobile station in a second predetermined time interval after said first predetermined time interval when the number of transmissions of said downlink packet transmission notification signal which is transmitted to said mobile station in said first predetermined time interval is larger than a second predetermined threshold value.

16. The radio communication system controlling method according to claim 12, wherein said mobile station transmits a third channel of said uplink and controls a transmission power of said third channel to meet required a quality by closed-loop type transmission power control and considers the power obtained by adding a predetermined power offset to the power of said third channel as the required transmission power of said reception result notification signal.

17. The radio communication system controlling method according to claim 12, wherein said mobile station considers the remaining power obtained by subtracting the required transmission power of said reception result notification signal from the maximum power of said mobile station as the power to be used for said first channel when the number of receptions of the downlink packet transmission notification signal directed to said mobile station which is received in said first predetermined time interval is one or more.

18. The radio communication system controlling method according to claim 15, wherein said base station refrains from transmitting the packet transmission notification signal to said mobile station in the second predetermined time interval after said first predetermined time interval when the number of transmissions of the downlink packet transmission notification signal which is transmitted to said mobile station in said first predetermined time interval is one or more.

19. A non-transitory computer-readable program of a radio communication system controlling method of controlling a radio communication system for high-speed packet transmission on an uplink and a downlink between a base station and a mobile station, which causes a computer of the mobile station to execute processing of, upon receiving a downlink packet transmission notification signal directed to said mobile station, receiving a corresponding downlink packet, processing of determining, for each transmission time unit of a first channel of the uplink, a power to be used in the transmission time unit according to a number of downlink packet transmission notification signals directed to said mobile station which have been received in a first predetermined time interval prior to the transmission time unit, processing of determining a transmission rate of the first channel based on the power to be used, and processing of transmitting an uplink packet by the first channel by using the determined transmission rate and transmitting a reception result notification signal of the corresponding downlink packet by a second channel of the uplink, wherein at said processing of determining power, considering the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

20. A radio communication system for high-speed packet transmission on an uplink and a downlink between a base station and a mobile station, in which said base station comprises:
a first transmission processing unit which transmits a downlink packet transmission notification signal to the mobile station and transmits a corresponding downlink packet to the mobile station after the transmission of the downlink packet transmission notification signal, and said mobile station comprises:
a reception unit which, upon receiving the downlink packet transmission notification signal directed to said mobile station, receives the corresponding downlink packet,
a first deciding unit which, for each transmission time unit of first channel of the uplink, determines a power to be used in the transmission time unit according to a number of downlink packet transmission notification signals directed to said mobile station which have been received in a predetermined time interval prior to the transmission time unit,
a second deciding unit which determines a transmission rate of the channel based on the power to be used, and
a transmission processing unit which transmits an uplink packet by the first channel by using the determined transmission rate after the determination of the transmission rate of the first channel and transmits a reception result notification signal of the corresponding downlink packet by another channel of the uplink,
wherein said first deciding unit considers the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

21. A mobile station for high-speed packet transmission on an uplink and a downlink provided between the mobile station and a base station, comprising:
a reception unit which receives a downlink packet corresponding to a downlink packet transmission notification signal directed to said mobile station,
a first deciding unit which, for each transmission time unit of a first channel of the uplink, determines a power to be used in the transmission time unit according to a number of downlink packet transmission notification signals directed to said mobile station which have been received in a predetermined time interval prior to the transmission time unit;
a second deciding unit which determines a transmission rate of the channel based on the power to be used; and
a transmission processing unit which transmits an uplink packet by the first channel by using the determined transmission rate after the determination of the transmission rate of the first channel and transmitting a reception result notification signal of the downlink packet by another channel of the uplink,
wherein said first deciding unit considers the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

22. A radio communication system controlling method of controlling a radio communication system for high-speed packet transmission on an uplink and a downlink between a base station and a mobile station, in which said base station transmits a downlink packet transmission notification signal and transmits a corresponding downlink packet after the transmission of the downlink packet transmission notification signal, and said mobile station receives the corresponding downlink packet corresponding to the downlink packet transmission notification signal directed to said mobile station, determines, for each transmission time unit of a first channel of the uplink, a power to be used in the transmission time unit according to a number of downlink packet transmission notification signals directed to said mobile station which have been received in a predetermined time interval prior to the transmission time unit, determines a transmission rate of the first channel based on the power to be used, transmits an uplink packet by the first channel by using the determined transmission rate and transmits a reception result notification signal of the corresponding packet by another channel of the uplink,
wherein said step of determining power comprises considering the remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

23. A method of controlling a mobile station for high-speed packet transmission on an uplink and a downlink provided between the mobile station and a base station, including following steps:

upon receiving a downlink packet transmission notification signal directed to said mobile station, receiving a corresponding downlink packet;

determining, for each transmission time unit of a first channel of the uplink, a power to be used in the transmission time unit according to a number of downlink packet transmission notification signals directed to said mobile station which have been received in a first predetermined time interval prior to the transmission time unit;

determining a transmission rate of the first channel based on the power to be used; and transmitting an uplink packet by the first channel by using the determined transmission rate and transmitting a reception result notification signal of the corresponding downlink packet by a second channel of the uplink, wherein said step of determining power comprises considering said remaining power obtained by subtracting a required transmission power of said reception result notification signal from a maximum power of said mobile station as the power to be used for said first channel when the number of receptions of the downlink packet transmission notification signal directed to said mobile station, which are received in said first predetermined time interval, is larger than a first predetermined threshold value.

24. A method of controlling a mobile station for high-speed packet transmission on an uplink and a downlink provided between the mobile station and a base station, including following steps:

receiving a downlink packet corresponding to a downlink packet transmission notification signal directed to said mobile station, determining, for each transmission time unit of a first channel of the uplink, a power to be used in the transmission time unit according to a number of downlink packet transmission notification signals directed to said mobile station which have been received in a predetermined time interval prior to the transmission time unit;

determining a transmission rate of the channel based on the power to be used; and transmitting an uplink packet by the channel by using the determined transmission rate and transmitting a reception result notification signal of the downlink packet by another channel of the uplink, wherein said step of determining power comprises considering the remaining power obtained by subtracting a required transmission power of said reception result notification signal from a maximum power of said mobile station as the power to be used for said first channel when the number of receptions of a downlink packet transmission notification signal directed to said mobile station, which are received in said first predetermined time interval, is larger than a first predetermined threshold value.

* * * * *

UNITED STATES PATENT AND TRADEMARK OFFICE
CERTIFICATE OF CORRECTION

PATENT NO. : 8,654,744 B2  Page 1 of 1
APPLICATION NO. : 11/577490
DATED : February 18, 2014
INVENTOR(S) : Nahoko Kuroda and Jinsock Lee It is certified that error appears in the above-identified patent and that said Letters Patent is hereby corrected as shown below:

On the Title Page, item (54), Column 1, Title: and in the Specification, Column 1, Line 1: Delete "RADIO COMMUNICATION SYSTEM, MOBILE STATION, BASE STATION, RADIO COMMUNICATION SYSTEM CONTROL METHOD USED FOR THE SAME, AND PROGRAM OF THE SAME" and
    insert -- SYSTEM AND METHOD FOR CONTROLLING HIGH-SPEED WIRELESS PACKET BETWEEN UPLINK AND DOWNLINK TRANSMISSIONS --, therefor.

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,654,744 B2
APPLICATION NO. : 11/577490
DATED : February 18, 2014
INVENTOR(S) : Kuroda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Twenty-ninth Day of September, 2015

Michelle K. Lee
*Director of the United States Patent and Trademark Office*